US012644842B1

(12) United States Patent
LaLone et al.

(10) Patent No.: US 12,644,842 B1
(45) Date of Patent: Jun. 2, 2026

(54) METHOD AND SYSTEM FOR QUANTIFYING A CONCENTRATION OF A CHEMICAL ENTITY IN A MATRIX

(71) Applicant: Wave Lumina Inc., Williamsburg, MI (US)

(72) Inventors: Vernon LaLone, Williamsburg, MI (US); John Woodruff, Traverse City, MI (US)

(73) Assignee: Wave Lumina Inc., Williamsburg, MI (US)

( * ) Notice: Subject to any disclaimer, the term of this patent is extended or adjusted under 35 U.S.C. 154(b) by 0 days.

(21) Appl. No.: 19/291,087

(22) Filed: Aug. 5, 2025

(51) Int. Cl.
*G01N 21/65* (2006.01)

(52) U.S. Cl.
CPC ... *G01N 21/658* (2013.01); *G01N 2201/0221* (2013.01)

(58) Field of Classification Search
CPC ..................... G01N 21/658; G01N 2201/0221
See application file for complete search history.

(56) References Cited

U.S. PATENT DOCUMENTS

| 8,699,020 B1 | 4/2014 | Zhou et al. |
| 11,874,167 B2 | 1/2024 | Watson et al. |
| 2025/0094380 A1* | 3/2025 | Mazed .................... G01S 17/08 |

FOREIGN PATENT DOCUMENTS

WO          2018053580 A1      3/2018

OTHER PUBLICATIONS

CN119880873 Chinese (Year: 2025).*
CN119880873 English translation (Year: 2025).*
Liu et al. Analytical and Bioanalytical Chemistry (2018) 410:5277 (Year: 2018).*
Reese et al. Forensic Science International 2021 328: 111000 (Year: 2021).*
Ricci et al. Journal of Spectroscopy 2016 vol.2016 total 10 pages (Year: 2016).*
Yan et al. Analytical Chemistry 2017 89:4875 (Year: 2017).*
Yin et al. npj Science of Food 2025 9:31 (Year: 2025).*
Zhang et al. Environ. Sci. Nano. 2020 7:1061 (Year: 2020).*
Peeler et al, Nanoscale Biodegradable Printing for Designed Tune-ability of Vaccine Delivery Kinetics, Research Article, 2025, pp. 1-14, Adanced Materials, Wiley-VCH-GmbH.
Adamson et al., Characterization of relevant site-specific PFAS fate and transport processes at multiple AFFF sites, Environmental Advances Journal, Jan. 13, 2022, 7, 100167, Elsevier.
Fang et al., Surface-enhanced Raman scattering (SERS) detection of fluorosurfactants in firefighting foams, RSC Advances Paper, Jan. 18, 2016, pp. 11140-11145, vol. 6, the Royal Society of Chemistry.
Huang et al., Trace PFAS Detection in Water Sources Using Silver Nanoparticles for Surface-Enhanced Raman Spectroscopy (Sers), IEEE 22nd International Conference on Nanotechnology, Jul. 4-8, 2022, pp. 342-345, Mallorca, Spain.
Mcdonnell et al., Aerosol Jet Printed Surface-Enhanced Raman Substrates: Application for High-Sensitivity Detection of Perfluoroalkyl Substances, ACS Omega, Dec. 20, 2022, pp. 1597-1605, vol. 8, ACS Publications.
Cho, et al., Common and Distinctive Raman Spectral Features for the Identification and Differentiation of Per- and Polyfluoroalkyl Substances, Acs Est Water, Dec. 10, 2024, pp. 300-309, vol. 5, ACS Publications.
M.B. et al., Detection of PFAS via surface-enhanced Raman scattering: Challenges and future perspectives, Sustainable Chemistry for the Environment Journal, Aug. 7, 2023, 3, 100031, Elsevier.
Fredsense Technologies Corp., A Novel Rapid PFAS Screening Method Validated With Real-World Samples, Rapid PFAS Method Case Study, Apr. 2024, pp. 1-4, FREDsense Technologies Corp.
Park et al., Novel ssDNA aptamer-based fluorescence sensor for perfluorooctanoic acid detection in water, Environment International Journal, Nov. 24, 2021, 158, 107000, Elsevier.
Sunantha et al., A method for detecting perfluorooctanoic acid and perfluorooctane sulfonate in water samples using genetically engineered bacterial biosensor, Science of the Total Environment Journal, Nov. 6, 2020, 759, 143544, Elsevier.
Young, et al., A Synthetic Biology Approach Using Engineered Bacteria to Detect Perfluoroalkyl Substance (PFAS) Contamination in Water, Military Medicine, Jan./Feb. 2021, pp. 801-807, vol. 186, Department of Biology, U.S. Air Force Academy, United States.
Gou et al., Multi-head cationic siloxane based turn on fluorescent system for selective detection of perfluorooctanoic sulfonate (PFOS), Sensors and Actuators: B. Chemical Journal, May 10, 2022, 367, 132017, Elsevier.
Law et al., Real-time detection of per-fluoroalkyl substance (PFAS) self-assembled monolayers in nanoporous interferometers, Sensors and Actuators: B. Chemical Journal, Dec. 31, 2021, 355, 131340, Elsevier.
Kumbhar et al., Rapid discrimination of porous bio-carbon derived from nitrogen rich biomass using Raman spectroscopy and artificial intelligence methods, Carbon Journal, Apr. 2, 2021, pp. 792-802, 178, Elsevier.

(Continued)

*Primary Examiner* — Changhwa J Cheu
(74) *Attorney, Agent, or Firm* — Quinn IP Law

(57)          ABSTRACT

A method of quantifying a concentration of a chemical entity in a matrix includes combining an aqueous buffer; a reporter reagent including at least one reporter molecule selectively bindable to the chemical entity; an organic, non-polar extraction solvent including an internal standard entity; a wash buffer; and the matrix to thereby prepare a liquid precursor. The method includes solvent extracting a sample from the liquid precursor. The sample includes at least one of the internal standard entity and a plurality of complexes formed from the chemical entity and the at least one reporter molecule. The method also includes scanning the sample with a surface-enhanced Raman spectrometer to produce a dataset including at least one of a plurality of target spectra of the chemical entity and a plurality of reference spectra of the internal standard entity. The method includes processing the dataset to thereby quantify the concentration of the chemical entity.

20 Claims, 4 Drawing Sheets

(56) References Cited

OTHER PUBLICATIONS

Pan et al., A review of artificial intelligence methods combined with Raman spectroscopy to identify the composition of substances, Journal of Raman Spectroscopy, Jul. 15, 2021, pp. 6-19, John Wiley & Sons, Ltd..

Sun et al., Sorptive removal of per- and polyfluoroalkyl substances (PFAS) in organic-free water, surface water, and landfill leachate and thermal reactivation of spent sorbents, Journal of Hazardous Materials Advances, May 4, 2023, pp. 1-10, 100311, Elsevier.

Xiao et al., Thermal Phase Transition and Rapid Degradation of Forever Chemicals (PFAS) in Spent Media Using Induction Heating, Acs Es&T Engineering, Apr. 26, 2023, pp. 1370-1380, ACS Publications.

Alinezhad et al., An Investigation of Thermal Air Degradation and Pyrolysis of Perand Polyfluoroalkyl Substances and Aqueous Film-Forming Foams in Soil, ACS ES&T Engineering, Jan. 11, 2022, pp. 198-209, ACS Publications.

Xiao et al., Thermal Decomposition of Anionic, Zwitterionic, and Cationic Polyfluoroalkyl Substances in Aqueous Film- Forming Foams, Environmental Science & Technology, Jul. 8, 2021, pp. 9885-9894, ACS Publications.

Sasi et al., Effect of granular activated carbon and other porous materials on thermal decomposition of per- and polyfluoroalkyl substances: Mechanisms and implications for water purification, Water Research Journal, May 19, 2021, pp. 200-210, 117271, Elsevier.

Xiao et al., Thermal Stability and Decomposition of Perfluoroalkyl Substances on Spent Granular Activated Carbon, Environmental Science & Technology Letters, Apr. 20, 2020, pp. 343-350, ACS Publications.

Fang et al., Smartphone app-based/portable sensor for the detection of fluorosurfactant PFOA, Chemosphere Journal, Oct. 10, 2017, pp. 381-388, 191, Elsevier.

Cai et al., Rapid Prescreening of Trace Imidacloprid in Drinking Water via Concentration-Dependent Surface- Enhanced Raman Spectroscopic Patterns, Oct. 25, 2023, pp. 1875-1885, ACS Publication.

Cho et al., Surface-enhanced Raman spectroscopy for emerging contaminant analysis in drinking water, Front. Environment Science Engineering, Nov. 21, 2022, pp. 1-15, Higher Education Press.

Rehman et al., Spectroelectrochemical investigation of the interaction of perfluorooctane sulfonic acid (PFOS) with organic dyes, Microchemical Journal, Jan. 5, 2025, pp. 1-8, 209, 112683, Elsevier.

Motomizu et al., Solvent Extraction—Spectrophotometric Determination of Anionic Surfactants with Ethyl Violet, Analytical Chemistry, Mar. 3, 1982, pp. 392-397. vol. 54, No. 3.

Li et al., Direct and Rapid Sensing of Per- and Polyfluoroalkyl Substances Using SERS-Active Optical Fibers, ACS Applied Optical Materials, Mar. 25, 2024, pp. 610-616, vol. 2, ACS Publications.

Rehman et al., Rapid Single-Step Detection of Polyfluoroalkyl Substances (PFAS) Using Electropolymerized Phenoxazine Dyes, Analytical Chemistry Article, Oct. 15, 2024, pp. 17506-17516, vol. 96, ACS Publications.

Lalone et al., Quantitative Raman chemical imaging of intracellular drug-membrane aggregates and small molecule drug precipitates in cytoplasmic organelles, Advanced Drug Delivery Reviews Journal, Septembr 26, 2023, 202, 115107, Elsevier.

Smith et al., An integrated analytical modeling framework for determining site-specific soil screening levels for PFAS, Water Research Journal, Feb. 1, 2024, pp. 1-15, 252, 121236, Elsevier.

Nguyen, et al., Influences of Chemical Properties, Soil Properties, and Solution pH on Soil-Water Partitioning Coefficients of Per- and Polyfluoroalkyl Substances (PFASs), Environmental Science & Technology Article, Nov. 28, 2020, pp. 15883-15892, vol. 54, ACS Publications.

Lu et al., An ultra-sensitive molecularly imprinted polymer (MIP) and gold nanostars (AuNS) modified voltammetric sensor for facile detection of perfluorooctance sulfonate (PFOS) in drinking water, Sensors and Actuators: B. Chemical Journal, Nov. 6, 2021, 352, 131055, Elsevier.

Clark et al., Electrochemical Sensing of Perfluorooctanesulfonate (PFOS) Using Ambient Oxygen in River Water, American Chemical Society Sensors Journal, vol. 5, 2020, pp. 3591-3598, ACS Publications.

Pierpaoli et al., Engineering boron and nitrogen codoped carbon nanoarchitectures to tailor molecularly imprinted polymers for PFOS determination, Journal of Hazardous Materials, Jun. 16, 2023, 458, 131873, Elsevier.

Trinh et al., Detection of PFAS and Fluorinated Surfactants Using Differential Behaviors at Interfaces of Complex Droplets, Article, 2022, pp. 1514-1523, ACS Publications.

Taylor, Chloe, Colourimetric PFAS Detection, Submitted in fulfilment of the requirements for the degree of Doctor of Philosophy, Jun. 2023, pp. 1-252, University of Tasmania.

Menger, et al., Colorimetric Paper-Based Analytical Device for Perfluorooctanesulfonate Detection, American Chemical Society ES&T Water, Mar. 8, 2022, pp. 565-572, ACS Publications.

Fredsense Technologies Corp., et al., World's First PFAS Field Kit Tested At West Coast US Airport, Oct. 2024, pp. 1-5, FREDsense Technologies Corp.

Mcqueen et al., Review of Emerging and Nonconventional Analytical Techniques for Per- and Polyfluoroalkyl Substances (PFAS): Application for Risk Assessment, Review, Jan. 22, 2025, pp. 1-31, vol. 17, 303, MDPI.

Feng et al., Ag Nanoparticle/Au@Ag Nanorod Sandwich Structures for SERSBased Detection of Perfluoroalkyl Substances, ACS Applied Nano Materials, Jul. 10, 2023, pp. 13974-13983, vol. 6, ACS Publications.

Vahedian et al., Influence of kinetic air-water interfacial partitioning on unsaturated transport of PFAS in sandy soils, Science of the Total Environment Journal, Nov. 4, 2024, 957, 177420, Elsevier.

Bell et al., Exposure, health effects, sensing, and remediation of the emerging PFAS contaminants—Scientific challenges and potential research directions, Science of the Total Environment, Mar. 17, 2021, pp. 1-10, 780, 146399, Elsevier.

Pelch et al., 70 analyte PFAS testmethod highlights need for expanded testing of PFAS in drinking water, Science of the Total Environment Journal, Mar. 17, 2023, 876, 162978, Elsevier.

Al Amin et al., Recent advances in the analysis of per- and polyfluoroalkyl substances (PFAS)—A review, Environmental Technology & Innovation Journal, May 7, 2020, 19, 100879, Elsevier.

Hanley, Adrian, Method 1633, Revision A, Analysis of Per- and Polyfluoroalkyl Substances (PFAS) in Aqueous, Solid, Biosolids, and Tissue Samples by LC-MS/MS, Dec. 2024, pp. 1-78, Method 1633A, U.S. Environmental Protection Agency Office of Water (4303T) Office of Science and Technology Engineering and Analysis Division, Washington, DC, United States.

Garg et al., Nano-enabled sensing of per-/poly-fluoroalkyl substances (PFAS) from aqueous systems—A review, Journal of Environmental Management, Feb. 2, 2022, 308, 114655, Elsevier.

Menger et al., Sensors for detecting per- and polyfluoroalkyl substances (PFAS): A critical review of development challenges, current sensors, and commercialization obstacles, Chemical Engineering Journal, Feb. 27, 2021, 417, 129133, Elsevier.

Thompson et al., Recent progress in per- and polyfluoroalkyl substances (PFAS) sensing: A critical mini-review, Sensors and Actuators Reports Journal, Mar. 1, 2024, 7, 100189, Elsevier.

Sahu, et al., Rapid and Direct Perfluorooctanoic Acid Sensing with Selective Ionomer Coatings on Screen-Printed Electrodes under Environmentally Relevant Concentrations, American Chemical Society Omega, 2022, pp. 5001-5007, ACS Publications.

Gogoi et al., Understanding PFOS Adsorption on a Pt Electrode for Electrochemical Sensing Applications, ChemElectroChem Research Article, 2022, pp. 1-6, Wiley-VCH GmbH.

Lamichhane, et al., Ion-transfer electroanalytical detection of perfluorooctanoic acid at a liquid-liquid microinterface array, Sensors & Diagnostics Paper, the Royal Society of Chemistry Journal, Jun. 23, 2023, pp. 938-947, the Royal Society of Chemistry.

Islam et al., Voltammetric Selectivity in Detection of Ionized Perfluoroalkyl Substances at Micro-Interfaces between Immiscible

(56)          References Cited

OTHER PUBLICATIONS

Electrolyte Solutions, ACS Sensors Journal, Sep. 16, 2022, pp. 2960-2967, vol. 7, ACS Publications.

Barros Da Silva et al., Tunable Hybrid Hydrogels of Alginate and Cell-Derived dECM to Study the Impact of Matrix Alterations on Epithelial-to-Mesenchymal Transition, Research Article, 2024, pp. 1-17, Advanced Healthcare Materials, Wiley-VCH GmbH.

Lalone et al., Quantitative chemometric phenotyping of threedimensional liver organoids by Raman spectral imaging, Cell Reports Methods Article, Apr. 23, 2023, pp. 1-21, CellPress.

Lalone et al., Inkjet-Printed Micro-Calibration Standards for Ultraquantitative Raman Spectral Cytometry, PMC, Jun. 21, 2020, pp. 1-20.

Lalone et al., An Expandable Mechanopharmaceutical Device (3): a Versatile Raman Spectral Cytometry Approach to Study the Drug Cargo Capacity of Individual Macrophages, CrossMark Research Paper, Nov. 6, 2018, pp. 1-11, Springer Science+Business Media LLC, part of Springer Nature.

Vahedian et al., Influence of Tension-Driven Flow on the Transport of AFFF in Unsaturated Media, American Chemical Society, 2004, pp. 564-574, ACS Publications.

Kookana et al., Key properties governing sorption-desorption behaviour of poly- and perfluoroalkyl substances in saturated and unsaturated soils: a review, Soil Research, Dec. 16, 2022, pp. 1-19, CSIRO Publishing.

Sharifan et al., Fate and transport of per- and polyfluoroalkyl substances (PFASs) in the vadose zoner, Science of the Total Environment Journal, Jan. 26, 2021, pp. 1-20, 771, 145427, Elsevier.

Guelfo et al., Environmental Sources, Chemistry, Fate, and Transport of Per- and Polyfluoroalkyl Substances: State of the Science, Key Knowledge Gaps, and Recommendations Presented at the Aug. 2019 SETAC Focus Topic Meeting, Critical Review, Environmental Toxicology and Chemistry, Feb. 22, 2021, pp. 3234-3260, vol. 40, Wiley Online Library.

Hakimabadi et al., Factors Affecting the Adsorption of Per- and Polyfluoroalkyl Substances (PFAS) by Colloidal Activated Carbon, Water Research Journal, Jun. 9, 2023, pp. 1-12, 242, 120212, Elsevier.

Cai et al., Effect of heavy metal co-contaminants on the sorption of thirteen anionic per- and poly-fluoroalkyl substances (PFAS) in soils, Science of the Total Environment Journal, Sep. 19, 2023, pp. 1-9, 905, 167188, Elsevier.

Cai et al., Increasing ionic strength and valency of cations enhance sorption through hydrophobic interactions of PFAS with soil surfaces, Science of the Total Environment Journal, Mar. 17, 2023, pp. 1-8, 817, 152975, Elsevier.

Sleep et al., Modelling of PFAS-surface interactions: Effect of surface charge and solution ions, Chemosphere Journal, Jan. 24, 2023, pp. 1-10, 319, 137910, Elsevier.

Higgins et al., Sorption of Perfluorinated Surfactants on Sediments, Environmental Science Technology., Oct. 7, 2006, pp. 7251-7256, vol. 40, No. 23, American Chemical Society.

Qi et al., The role of dissolved organic matter during Per- and Polyfluorinated Substance (PFAS) adsorption, degradation, and plant uptake: A review, Journal of Hazardous Materials, May 16, 2022, pp. 1-13, 436, 129139, Elsevier.

Mark L. Brusseau, Differential Sorption of Short-Chain versus Long-Chain Anionic Per- and Poly-Fluoroalkyl Substances by Soils, Article, Environments, 2023, pp. 1-13, MDPI.

Mark L. Brusseau The influence of molecular structure on the adsorption of PFAS to fluid-fluid interfaces: Using QSPR to predict interfacial adsorption coefficients, Water Research Journal, Jan. 11, 2019, pp. 148-158, Elsevier.

Navarro et al., Organic carbon and salinity affect desorption of PFAS from estuarine sediments, Journal of Soil and Sediments, Sec 2, Physical and Biogeochemical Processes, Research Article, 2022, pp. 1302-1314, Springer.

Jeon et al., Effects of salinity and organic matter on the partitioning of perfluoroalkyl acid (PFAs) to clay particles, Journal of Environmental Monitoring, 2011, pp. 1803-1810, The Royal Society of Chemistry.

Iannone et al., Poly- and Perfluoroalkyl Substance (PFAS) Analysis in Environmental Matrices: An Overview of the Extraction and Chromatographic Detection Methods, Analytica Journal, Apr. 19, 2024, pp. 187-202, MDPI.

Leung et al., Physicochemical properties and interactions of perfluoroalkyl substances (PFAS)—Challenges and opportunities in sensing and remediation, Science of the Total Environment Journal, Sep. 1, 2023, pp. 1-16, 906, 166764, Elsevier.

Dhiman et al., A review on extraction, analytical and rapid detection techniques of Per/Poly fluoro alkyl substances in different matrices, Microchemical Journal, Nov. 19, 2023, pp. 1-11, 196, 109667, Elsevier.

Dimpe et al., Current sample preparation methodologies for analysis of emerging pollutants in different environmental matrices, Trends in Analytical Chemistry Journal, 2016, pp. 199-207, 82, Elsevier.

Southerland et al., What Limits Will the World Health Organization Recommend for PFOA and PFOS in Drinking Water?, Environmental Science & Technology, Apr. 27, 2023, pp. 7103-7105, ACS Publications.

Gloria B. Post, Recent US State and Federal Drinking Water Guidelines for Per- and Polyfluoroalkyl Substances, Environmental Toxicology and Chemistry, Aug. 20, 2020, pp. 550-563, vol. 40, No. 3.

* cited by examiner

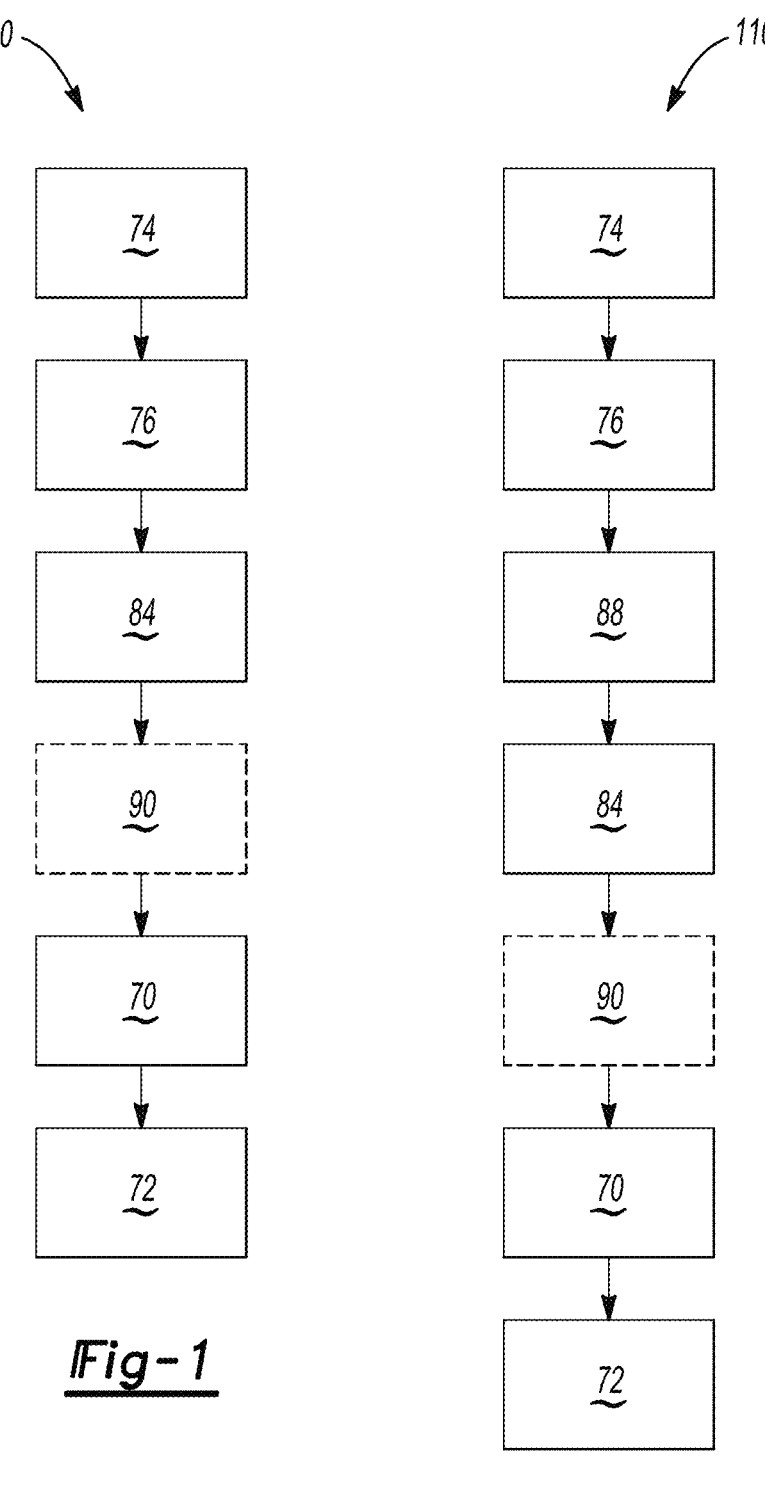
_Fig-1_
_Fig-2_

METHOD AND SYSTEM FOR QUANTIFYING A CONCENTRATION OF A CHEMICAL ENTITY IN A MATRIX

INTRODUCTION

The disclosure relates to a method and system for quantifying a concentration of a chemical entity in a matrix.

Various chemical entities may be present in groundwater, surface water, landfill leachate, and the like. For example, chemical entities such as per- and polyfluoroalkyl substances (PFAS) may be present in groundwater due to runoff from industrial processes, equipment maintenance, use of aqueous film-forming foam, and the like. PFAS may be especially persistent in a matrix such as groundwater due to a high resistance to degradation based on strong carbon-fluorine bonds, and as such, may pose a risk to ecosystems and human health. However, detection and analysis of specific chemical entities is often challenging based on complex sample preparation processes, extended analysis turnaround times, and costs associated with detecting a presence of the chemical entity, identifying a specific makeup of the chemical entity, and accurately measuring a concentration of the chemical entity in the matrix.

SUMMARY

A method of quantifying a concentration of a chemical entity in a matrix includes combining an aqueous sample buffer; a reporter reagent including at least one reporter molecule selectively bindable to the chemical entity; an organic, non-polar extraction solvent including an internal standard entity; a wash buffer; and the matrix to thereby prepare a liquid precursor. The method also includes solvent extracting a sample from the liquid precursor, wherein the sample includes at least one of the internal standard entity and a plurality of complexes formed from the chemical entity and the at least one reporter molecule. In addition, the method includes scanning the sample with a surface-enhanced Raman spectrometer to produce a dataset including at least one of a plurality of target spectra of the chemical entity and a plurality of reference spectra of the internal standard entity. The method also includes processing the dataset to thereby quantify the concentration of the chemical entity in the matrix.

In one aspect, combining may include selectively binding the at least one reporter molecule to the chemical entity to thereby enhance an intensity of the plurality of target spectra.

In an additional aspect, combining may include adding the aqueous sample buffer and the reporter reagent to the matrix to form a first intermediate in a first container; adding the organic, non-polar extraction solvent to the first intermediate to form a second intermediate; and mixing the second intermediate for a first duration.

In another aspect, solvent extracting may include, after mixing the second intermediate, settling the second intermediate for a second duration. After settling the second intermediate, solvent extracting may include transferring an extract supernatant of the organic, non-polar extraction solvent from the first container to a second container containing the wash buffer to thereby mix the extract supernatant of the non-polar extraction solvent and the wash buffer and form a third intermediate; and mixing the third intermediate for the first duration. After mixing, the third intermediate, solvent extracting may include settling the third intermediate for the second duration.

In a further aspect, solvent extracting may further include, after settling the third intermediate, depositing the extract supernatant of the organic, non-polar extraction solvent onto a pre-calibrated surface-enhanced Raman spectroscopy (SERS) substrate that includes a surface and a plurality of nanoparticles disposed on the surface. After depositing, solvent extracting may include evaporating the extract supernatant of the organic, non-polar extraction solvent for a third duration that is longer than the second duration to thereby dispose the sample on the plurality of nanoparticles.

In one aspect, depositing may include drop casting the extract supernatant of the organic, non-polar extraction solvent onto the pre-calibrated SERS substrate in a first region.

In an additional aspect, scanning may include optically scanning the first region and a plurality of additional regions adjacent to the first region on the pre-calibrated SERS substrate to produce at least one of from 5 target spectra to 10,000 target spectra and from 5 reference spectra to 10,000 reference spectra.

In another aspect, processing may include qualitatively detecting whether the chemical entity is present in the matrix in from 1 minute to 2 hours.

In a further aspect, processing may include quantitatively assessing the concentration of the chemical entity in the matrix at a level of from 3 parts per trillion of the chemical entity to 100 parts per million of the chemical entity in from 1 minute to 2 hours.

In one aspect, the surface-enhanced Raman spectrometer may have at least one acquisition parameter including an integration time, an excitation intensity, and a focal positioning. The method may further include verifying the at least one acquisition parameter with an artificial neural network before scanning, and optionally, dynamically adjusting the at least one acquisition parameter before scanning.

In an additional aspect, processing may include transforming the dataset with an artificial neural network to thereby predict the concentration of the chemical entity in the matrix.

In another aspect, transforming may include training the artificial neural network with a training dataset.

In a further aspect, training may include creating the training dataset by preparing a plurality of samples each having a separate determined concentration of the chemical entity and scanning each of the plurality of samples with the surface-enhanced Raman spectrometer.

In one aspect, creating the training dataset may include applying a centering filter to the dataset to reduce variation between each of the plurality of target spectra and a respective one of the plurality of reference spectra and produce a pre-processed centered dataset including at least one of a plurality of centered target spectra and a plurality of centered reference spectra.

In an additional aspect, creating the training dataset may include normalizing the plurality of centered target spectra with respect to the plurality of centered reference spectra and producing a plurality of normalized target spectra.

In another aspect, creating the training dataset may include partitioning the plurality of normalized target spectra into a first training portion configured for inputting into the artificial neural network to thereby produce an estimated concentration for each of the plurality of samples; and a second validation portion configured for validating a result of the artificial neural network.

A method of quantifying a concentration of per- and polyfluoroalkyl substances (PFAS) in a matrix includes combining an aqueous sample buffer; a reporter reagent including at least one reporter molecule selectively bindable to the PFAS; an organic, non-polar extraction solvent including an internal standard entity having a conjugated phenyl ring and a carbon-carbon triple bond; a wash buffer; and the matrix to thereby prepare a liquid precursor. The method further includes solvent extracting a sample from the liquid precursor in less than or equal to 90 minutes, wherein the sample includes at least one of the internal standard entity; and a plurality of complexes formed from the PFAS and the at least one reporter molecule. In addition, the method includes depositing the sample onto a pre-calibrated surface-enhanced Raman spectroscopy (SERS) substrate that includes a surface and a plurality of nanoparticles disposed on the surface. After depositing, the method includes scanning the sample with a surface-enhanced Raman spectrometer having at least one acquisition parameter including an integration time, an excitation intensity, and a focal positioning to produce a dataset including at least one of a plurality of target spectra of the PFAS; and a plurality of reference spectra of the internal standard entity. Prior to scanning, the method includes verifying the at least one acquisition parameter and with an artificial neural network, and optionally, dynamically adjusting the at least one acquisition parameter. The method also includes processing the dataset with the artificial neural network to thereby quantify the concentration of the chemical entity in the matrix at a level of from 3 parts per trillion of the chemical entity to 100 parts per million of the chemical entity in from 1 minute to 2 hours.

In one aspect, processing may include filtering out environmental interference within the matrix from at least one of humic acid, chloride, and background fluorescence within the surface-enhanced Raman spectrometer.

A system for quantifying a concentration of a chemical entity in a matrix includes a sample preparation kit configured for preparing a sample solvent extracted from a liquid precursor formed from the matrix. The sample preparation kit includes an aqueous sample buffer; a reporter reagent including at least one reporter molecule selectively bindable to the chemical entity; an organic, non-polar extraction solvent including an internal standard entity; a wash buffer; and a pre-calibrated surface-enhanced Raman spectroscopy (SERS) substrate. The pre-calibrated SERS substrate includes a surface and a plurality of nanoparticles disposed on the surface. The system also includes an instrument configured for analyzing the sample disposed on the plurality of nanoparticles of the pre-calibrated SERS substrate. The instrument includes a surface-enhanced Raman spectrometer configured for optically scanning the sample to produce a dataset including at least one of a plurality of target spectra of the chemical entity and a plurality of reference spectra of the internal standard entity. The instrument further includes an artificial neural network configured for processing the dataset, and a controller in communication with the surface-enhanced Raman spectrometer and including an instruction set that is executable to process the dataset with the artificial neural network to thereby quantify the concentration of the chemical entity in the matrix.

In one aspect, the instrument may be portable.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

FIG. 1 is a schematic flow diagram of a method of quantifying a concentration of a chemical entity in a matrix.

FIG. 2 is a schematic flow diagram of a method of quantifying a concentration of per- and polyfluoroalkyl substances (PFAS) in a matrix.

DETAILED DESCRIPTION

Figure 3:
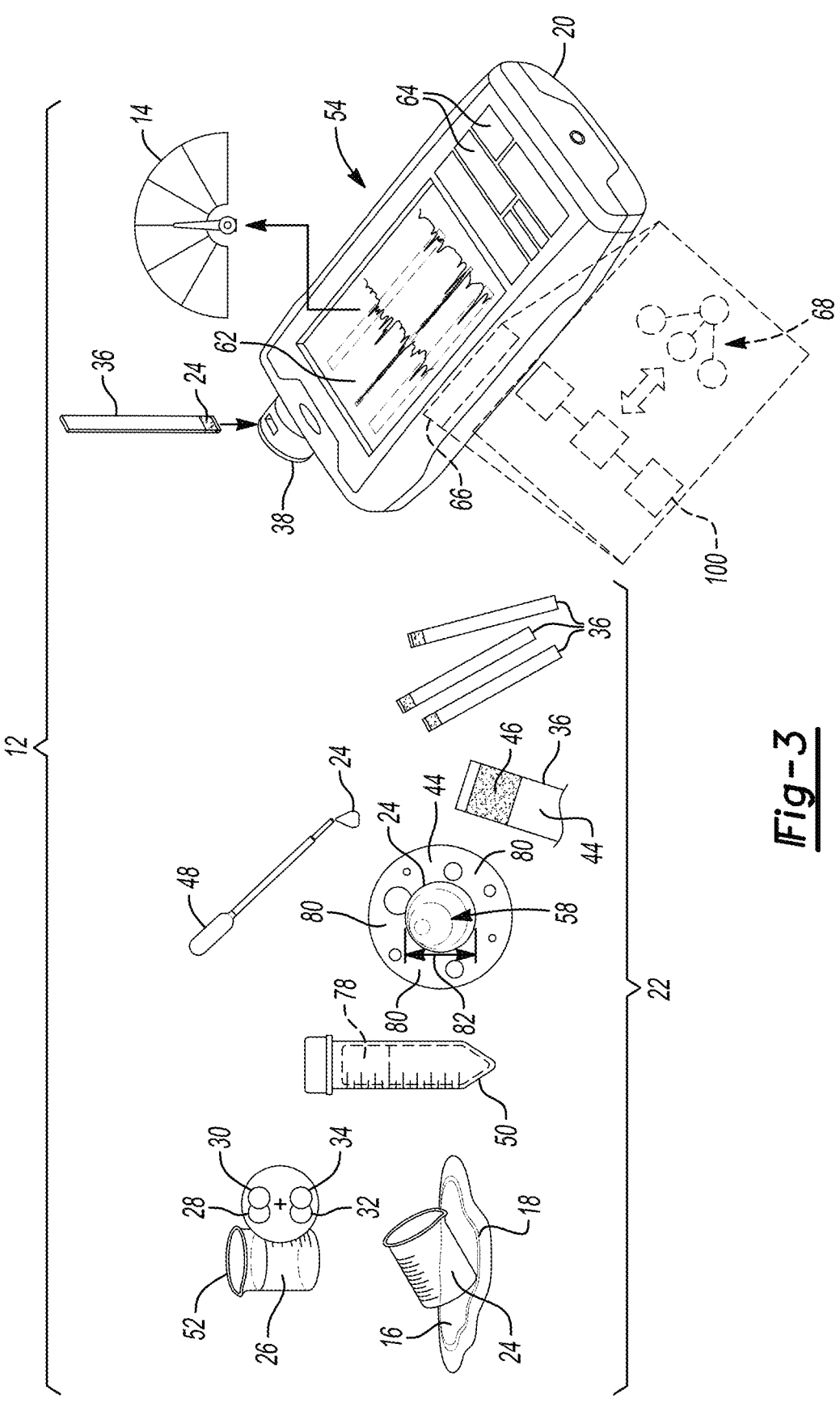
FIG. 3 is a schematic illustration of a system for quantifying a concentration of a chemical entity in a matrix, wherein the system includes a surface-enhanced Raman spectrometer configured for generating a plurality of target spectra to graphically represent a relationship between a Raman intensity and a wavenumber for the chemical entity.

Referring to the Figures, wherein like reference numerals refer to like elements, a method 10, 110 (FIGS. 1 and 2) of and system 12 (FIG. 3) for quantifying a concentration 14 (FIG. 3) of a chemical entity 16 (FIG. 3) in a matrix 18 (FIG. 3) are shown generally. The method 10, 110 and system 12 may be useful for applications requiring rapid, precise, cost-effective, on-site or in-field testing of matrices 18, particularly liquid matrices 18 such as groundwater, surface water, drinking water, landfill leachate, process effluent, equipment rinsate, and the like, for chemical entities 16 or analytes such as, but not limited to, per- and polyfluoroalkyl substances (PFAS) 116 (FIG. 4) at parts-per-trillion (ppt) levels without extensive sample preparation. In particular, the method 10, 110 and system 12 may provide rapid, user-friendly, cost-effective, field-deployable or inline detection for monitoring, remediation, and compliance using a real-time sensor instrument 20 (FIG. 3) for selectively and accurately detecting and quantifying PFAS 116 in complex environmental matrices 18 without extensive sample preparation or user training.

As such, the method 10, 110 and system 12 may be useful for selectively and accurately detecting and quantifying a concentration 14 of chemical entities 16 such as, but not limited to, PFAS, humic acid, chloride, and combinations thereof in diverse environmental matrices 18. In particular, PFAS 116 may include both long-chain PFAS 116, such as perfluorooctanoic acid (PFOA) 116-1 (FIG. 4), perfluorooctanesulfonic acid (PFOS) 116-2 (FIG. 4), perfluoronitonanoic acid (PFNA), and perfluorohexane sulfonic acid (PFHxS); and short-chain PFAS 116, such as hexafluoropropylene oxide dimer acid (HFPO-DA) and its ammonium salt (i.e., collectively, GenX chemicals) and perfluorobutanesulfonic acid (PFBS).

System and Sample Preparation Kit

Referring now to FIG. 3, the system 12 for quantifying the concentration 14 of the chemical entity 16 in the matrix 18 includes a sample preparation kit 22. As set forth in more detail below, the sample preparation kit 22 is configured for preparing a sample 24 that is solvent-extracted from a liquid precursor 26 formed from the matrix 18. The sample preparation kit 22 includes an aqueous sample buffer 28; a reporter reagent 30 including at least one reporter molecule selectively bindable to the chemical entity 16; an organic, non-polar extraction solvent 32 including an internal standard entity; a wash buffer 34; and a pre-calibrated surface-enhanced Raman spectroscopy (SERS) substrate 36.

Aqueous Sample Buffer

In one non-limiting example, the aqueous sample buffer 28 may be prepared by mixing together hydrochloric acid (2.0 molar (M)), an acetate buffer (1 M, pH 4.0), and sodium sulfate (1 M). For example, to prepare 10 milliliters (mL) of the aqueous sample buffer 28, 62 microliters (uL) of hydrochloric acid (2.0 M), 5 mL of the acetate buffer (1 M, pH 4.0), and 5 mL of sodium sulfate (1 M) may be mixed together to prepare a solution. Then, 1 mL of water may be mixed with 80 μL of the prepared solution to prepare the aqueous sample buffer 28 having the following concentrations: hydrochloric acid=12.32 millimolar (mM); acetate buffer (pH 4.0)=0.5 M; sodium sulfate=0.5 M.

Reporter Reagent

Figure 4:
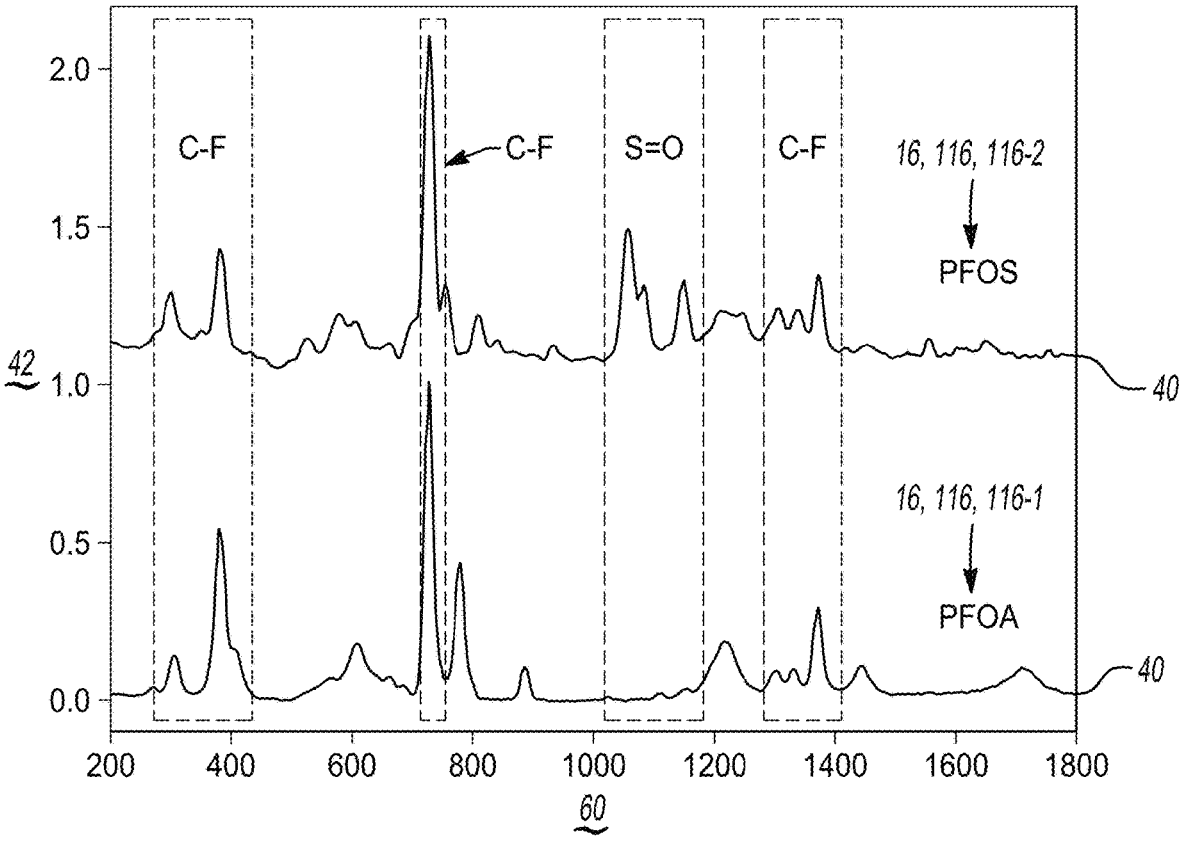
FIG. 4 is schematic illustration of a plurality of target spectra generatable by the system of FIG. 3 for two chemical entities.
Figure 5:
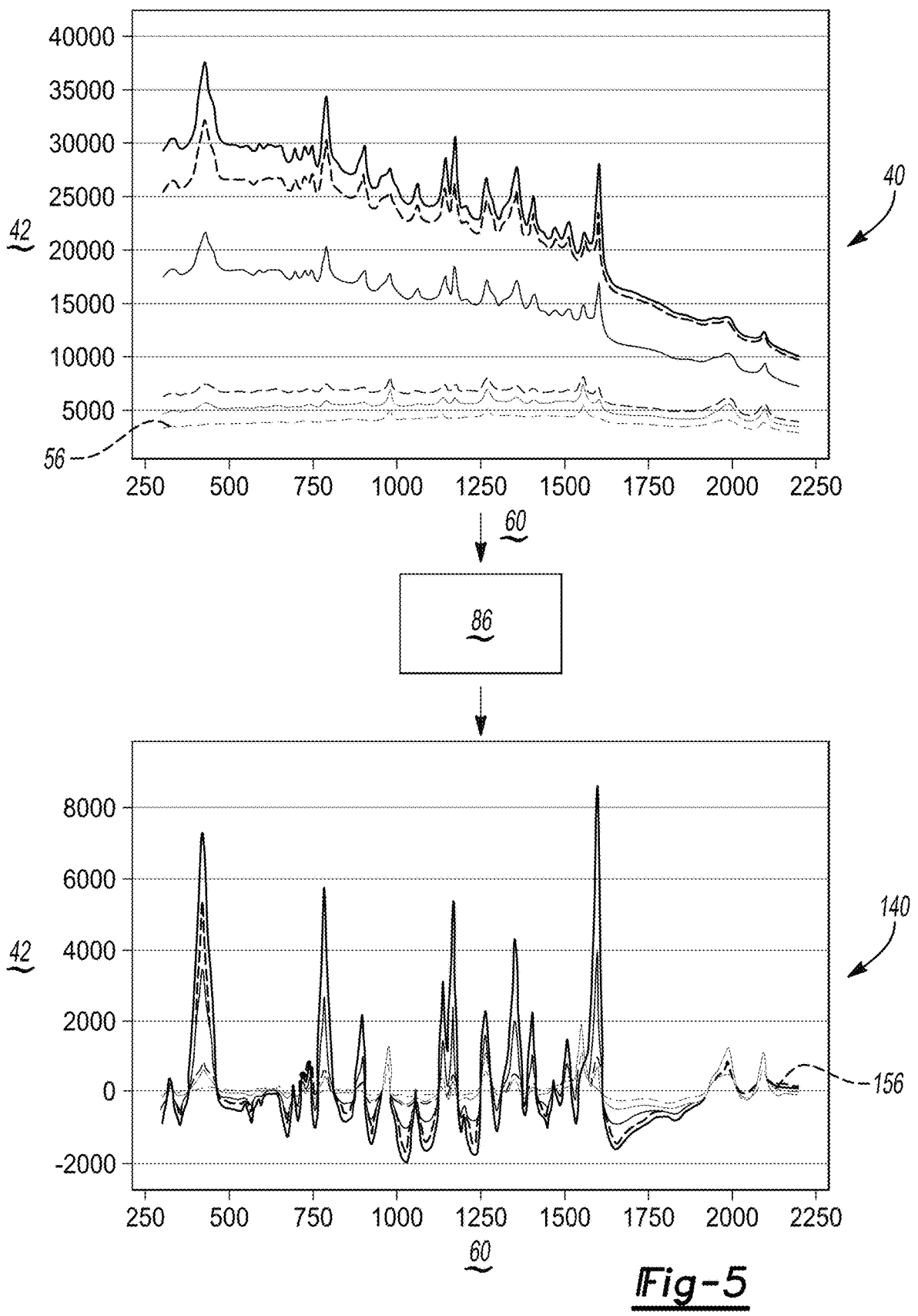
FIG. 5 is a schematic illustration of a portion of the methods of FIGS. 1 and 2 pertaining to processing a plurality of target spectra and a plurality of reference spectra generatable by the system of FIG. 3.

The reporter reagent 30 may be selected to enhance a dataset 54 (FIG. 3) of a surface-enhanced Raman spectrometer 38 (FIG. 3). That is, more specifically and as set forth in more detail below, the surface-enhanced Raman spectrometer 38 may use laser energy to induce molecular vibrations which may be output as a target spectrum 40. As best shown in FIGS. 4 and 5, the target spectrum 40 may be a graphical representation of a relationship between a Raman intensity 42, i.e., a strength or magnitude of scattered light at specific wavelengths and measured in charge-coupled device (CCD) counts or arbitrary units (a.u.), and a wavenumber 60 or a number of wavelengths that fit into one centimeter and measured in reciprocal centimeters ($cm^{-1}$). More specifically, CCD counts are raw values of the strength or magnitude of scattered light off the surface-enhanced Raman spectrometer 38 and a.u. are values of the strength or magnitude of scattered light after performing spectral processing.

The reporter reagent 30 may be selected to enhance an intensity of the target spectrum 40 of the chemical entity 16. In particular, the reporter reagent 30 includes the at least one reporter molecule that selectively binds to the chemical entity 16 to thereby enhance the intensity of the target spectrum 40. Suitable examples of the reporter reagent 30 may include, but are not limited to, cationic triarylmethane dyes such as ethyl violet; phenoxazine dyes such as meldola blue; basic dyes such as cresyl violet; and combinations thereof.

In one non-limiting example, the reporter reagent 30 may be prepared by first preparing an ethyl violet stock solution (1,000 parts per million (ppm) in methanol); a sodium sulfate solution (1 M); and an extraction solvent. The ethyl violet stock solution may be prepared by transferring 25 milligrams (mg) of ethyl violet to a 50 mL tube, then adding 25 mL of methanol to the 50 mL tube, and then mixing the contents of the 50 mL tube to dissolve the contents completely. The sodium sulfate solution (1 M) may be prepared by transferring 7.1025 g of sodium sulfate and water to a 50 mL tube for a final volume of 50 mL. The extraction solvent may be prepared by adding 75 mL of toluene and 25 mL of hexane to a PYREX® glass 100 mL container and shaking to mix well.

Next, to prepare the reporter reagent 30 (30 ppm in water), 9.2 mL of water, 300 μL of the ethyl violet stock solution (1,000 ppm in methanol), and 500 μL of the sodium sulfate solution (1 M) may be transferred to a 50 mL tube. At room temperature, 3 mL of the extraction solvent may be added to the 50 mL tube, shaken vigorously for 10 seconds, and left to settle for approximately 1 minute until phase separation is complete. Then, using a pipette, an organic phase in a top layer of the 50 mL tube may be discarded. To continue preparing the reporter reagent 30 (30 ppm in water), the above-described preparation procedure may be repeated five times. Then, 3 mL of the extraction solvent may be added gently to a top surface of the contents of the 50 mL tube with no mixing, and the organic phase in the top layer of the 50 ml tube may be discarded.

Organic, Non-Polar Extraction Solvent with Internal Standard Entity

The organic, non-polar extraction solvent 32 including the internal standard entity may provide quality control verification for the method 10, 110 and may account for environmental interference and measurement variables such as ambient temperature, humidity, and user-to-user variability in sample 24 preparation (e.g., sample 24 deposition, substrate 36 fabrication differences, etc.). That is, the organic, non-polar extraction solvent 32 including the internal standard entity may ensure consistent quantification results across diverse conditions, and may enable real-time signal normalization, quality control, and calibration to eliminate calibration by non-expert end-users to thereby achieve measurement and quantification reproducibility in field or in-line conditions. Stated differently, the organic, non-polar extraction solvent 32 including the internal standard entity may allow the surface-enhanced Raman spectrometer 38 and each sample 24 to be pre-calibrated, enhancing reliability of the method 10, 110.

The organic, non-polar extraction solvent 32 including the internal standard entity may be selected to include unique physiochemical properties and Raman signatures arising from, for example, conjugated phenyl rings and carbon-carbon triple bonds to enable robust and accurate quantification of, for example, PFAS 116. Suitable examples of the internal standard entity may include, but are not limited to 1,3,5-Triscarboxyphenylethynylbenzene (1,3,5-TEB), phenylacetylene, benzonitrile, and the like.

In one non-limiting example, the organic, non-polar extraction solvent 32 (10 mg/mL 1,3,5-TEB in methanol) including the internal standard entity may be prepared by transferring 50 mg of 1,3,5-TEB and 5 mL of methanol to a 50 mL tube and vortexing vigorously to dissolve the contents of the 50 mL tube completely.

Wash Buffer

The wash buffer 34 may be selected to rinse away any unbound components and contaminants while retaining the chemical entity 16 and internal standard entity during preparation of the sample 24. In one non-limiting example, the wash buffer 34 (20 mM hydrochloric acid in water) may be prepared as follows. For 1 mL of the wash buffer 34 (20 mM hydrochloric acid in water), 10 μL of hydrochloric acid (2 M) may be transferred into 1 mL of water and mixed well. For 10 mL of the wash buffer 34 (20 mM hydrochloric acid in water), 100 μL of hydrochloric acid (2 M) may be transferred into 10 mL of water and mixed well. For 50 mL of the wash buffer 34 (20 mM hydrochloric acid in water), 500 μL of hydrochloric acid (2 M) may be transferred into 50 mL of water and mixed well.

Pre-Calibrated SERS Substrate

Referring again to FIG. 3, the pre-calibrated SERS substrate 36 may include a surface 44 and a plurality of nanoparticles 46 disposed on the surface 44. For the method 10, 110 and as set forth in more detail below, the sample 24 may be deposited onto the plurality of nanoparticles 46.

The plurality of nanoparticles 46 may be selected to amplify an intensity of the plurality of target spectra 40 produced by the surface-enhanced Raman spectrometer 38 and may be engineered for optimal plasmonic resonance. For example, the plurality of nanoparticles 46 may be metallic, may have a comparatively high surface area, may have a finger-like shape extending from the surface 44, and may be selected from gold, silver, platinum, copper, graphene, and combinations thereof. Non-limiting examples of the pre-calibrated SERS substrate 36 may include prepared microscope slides including the plurality of nanoparticles 46, colloidal solutions including the plurality of nanoparticles 46 in suspension on the surface 44, and fabricated chips with precisely arranged nanoparticles 46 disposed on the surface 44.

As shown in FIG. 3, the sample preparation kit 22 may also include pipettes 48 and collection containers, e.g., PFAS 116-free sample tubes 50, mixing vessels 52, and the like.

System and Instrument

As described with continued reference to FIG. 3, the system 12 for quantifying the concentration 14 of the chemical entity 16 in the matrix 18 also includes the instrument 20 configured for analyzing the sample 24 disposed on the plurality of nanoparticles 46 of the pre-calibrated SERS substrate 36. In one example, the instrument 20 may be portable, such as a hand-held device, and may be suitable for use in harsh environmental conditions including humidity and temperature extremes, particulate-rich environments, and the like. That is, the instrument 20 may be configured to be carried by a user to and from a testing site and may weigh less than 23 kilograms. For example, during use, the instrument 20 may be held in one hand of a user and operated with the other hand of the user. Alternatively, the instrument 20 may be configured as a benchtop or in-line device for laboratory or manufacturing use, e.g., for use by municipal drinking and wastewater facilities. For example, the instrument 20 may be configured to be installed or attached to a laboratory bench top, table, or support structure or may be a standalone unit configured for resting on a facility floor and interfacing with other laboratory or manufacturing equipment.

Surface-Enhanced Raman Spectrometer

As shown generally in FIG. 3, the instrument 20 includes the surface-enhanced Raman spectrometer 38 configured for optically scanning the sample 24 to produce the dataset 54 including the plurality of target spectra 40 (FIGS. 4 and 5) of the chemical entity 16 and a plurality of reference spectra 56 (FIG. 5) of the internal standard entity. The surface-enhanced Raman spectrometer 38 may include a laser (not shown) configured to produces a single, pure, monochromatic color of light having a wavelength or excitation energy of, for example, 532 nanometers (nm) (green), 633 nm (red), or 785 nm (near-infrared) depending on the chemical entity 16 to be analyzed and the type of pre-calibrated SERS substrate 36.

In addition, although also not shown, the surface-enhanced Raman spectrometer 38 may include, for example, an optics system including focusing optics, collection optics, and filters. The optics system may include one or more lenses that focus the laser onto the pre-calibrated SERS substrate 36. The collection optics may include the same or different one or more lenses that collect scattered light from the laser returning from the sample 24 disposed on the pre-calibrated SERS substrate 36. The filters may be configured for blocking reflected light from the laser while allowing a comparatively weaker Raman-scattered light to pass.

The surface-enhanced Raman spectrometer 38 may also include diffraction grating configured for separating different wavelengths of light and spreading the wavelengths along distinct positions. Further, the surface-enhanced Raman spectrometer 38 may include a charge-coupled device camera configured to capture scattered light and convert the scattered light into electrical signals.

In operation, the surface-enhanced Raman spectrometer 38 may measure or analyze the sample 24 disposed on the pre-calibrated SERS substrate 36. That is, although set forth in more detail below pertaining to the method 10, 110, in general, the sample 24 including the chemical entity 16 and the internal standard entity disposed on the pre-calibrated SERS substrate 36 may be brought into contact with the laser. The laser may excite the plurality of nanoparticles 46 disposed on the surface 44 of the substrate 36 and the chemical entity 16 such that the plurality of nanoparticles 46 create comparatively intense local fields that amplify the Raman scattering from molecules of the chemical entity 16. Such enhanced Raman-scattered light may be collected and a resulting plurality of target spectra 40 and plurality of reference spectra 56 each having specific peaks at specific wavelengths according to the molecules present in the chemical entity 16 and the internal standard entity may be produced.

As such, the surface-enhanced Raman spectrometer 38 may have at least one acquisition parameter including an integration time, an excitation intensity, and a focal positioning. Integration time may refer to an exposure time of the surface-enhanced Raman spectrometer 38, or how long the collection optics and charge-coupled device camera collect photons from the scattered light during each measurement. As the laser contacts the sample 24, only a tiny fraction of the photons may Raman scatter, e.g., 1 in 10 million photons. The integration time may determine how many of these scarce Raman photons are gathered by the charge-coupled device camera. Longer integration times may allow more photons to accumulate, improving the signal-to-noise ratio and producing comparatively cleaner spectra 40, 56 with better-defined peaks.

Excitation energy may refer to the energy of the laser light used to illuminate the sample 24 and generate the Raman scattering effect. Excitation energy may typically be expressed as the laser wavelength, e.g., 532 nm, 638 nm, 785 nm, or 1064 nm. Shorter wavelengths or higher energies may produce comparatively stronger Raman signals. However, higher excitation energies may also induce fluorescence in the sample 24, which may overwhelm a weaker Raman signal. That is, fluorescence may be a competing process in which the sample 24 absorbs the laser light and re-emits the light at longer wavelengths, creating a broad background that masks the sharp Raman peaks in the target spectra 40 and reference spectra 56. In one non-limiting example, the excitation energy of the surface-enhanced Raman spectrometer 38 may be 638 nm and the laser may have a power of about 5 milliwatt (mW) at the surface 44 of the pre-calibrated SERS substrate 36.

Focal positioning may refer to precisely controlling a location at which the laser is focused on the sample 24. Focal positioning may involve adjusting 90 (FIGS. 1 and 2) a position of an optical lens or sample 24 to achieve optimal focus at an exact location. Poor focal positioning may result in weak Raman signals and poor spatial resolution. Therefore, maintaining consistent focal positioning may enable reproducible results for quantification of the concentration 14 of the chemical entity 16 in the matrix 18.

The output of the surface-enhanced Raman spectrometer 38, i.e., the dataset 54, may be a graphical representation of a relationship between Raman intensity 42 and wavenumber 60, e.g., the plurality of target spectra 40 and the plurality of reference spectra 56. Each peak on each graphical representation may correspond to a specific molecular vibration. As such, the plurality of target spectra 40 and the plurality of reference spectra 56 may serve as a molecular fingerprint or signature for the chemical entity 16 with respect to the internal standard entity, as also set forth in more detail below.

User Display

Referring again to FIG. 3, the instrument 20 may also include a user display 62 or human machine interface configured for receiving an input 64 from a user, e.g., a non-expert or untrained user. The user display 62 may be electrically connected to a communication bus (not shown) and may transmit data and computerized commands therethrough to execute aspects of the method 10, 110. For example, the user display 62 may include a computerized touch screen display that may be configured to receive input 64 such as, but not limited to, a pre-scan or acquisition parameter verification command, a scan or process command, and a power on/off command. The user display 62 may also include electronic toggle switches or input buttons configured to actuate various aspects of the method 10, 110. In another embodiment, the user display 62 may be configured as an input screen or graphical user interface for a mobile communication device such as a cellular telephone.

Artificial Neural Network

As described with continued reference to FIG. 3, the instrument 20 further includes an artificial neural network, shown generally at 68, configured for processing 72 (FIGS. 1 and 2) the dataset 54. The artificial neural network 68 may be a learning computer model configured to process or transform the dataset 54 from the instrument 20 and surface-enhanced Raman spectrometer 38. More specifically, and as set forth in more detail below, the artificial neural network 68 may provide variance reduction via preprocessing of target and reference spectra 40, 56 to focus spectral peaks and remove variation based on substrate 36 movement in the Raman spectrometer 38; may provide improved measurement validation by normalizing the target spectra 40 relative to the known internal standard entity, e.g., by confirming a presence of the internal standard entity and a difference in the reference spectra 56 relative to the target spectra 40; and may provide quantitative prediction of the concentration 14 of the chemical entity 16 in the matrix 18 using trained artificial intelligence. In particular, the artificial neural network 68 may process the plurality of target spectra 40 and the plurality of reference spectra 56 to provide a predicted or actual concentration 14 of the chemical entity 16 based on the sample 24.

As described broadly, the artificial neural network 68 may be configured to transform the dataset 54 in processing stages that may include, for example, optional pre-processing, optional linear dimensionality reduction, and estimation or prediction of the concentration of the 14 of the chemical entity 16 in the matrix 18. For example, the pre-processing stage may be an optional deterministic or closed-form step that may include using a pre-determined linear filter or fitting a smooth curve to the dataset 54, and removing the smooth curve to thereby focus on peaks and valleys in preparation for transformation of the dataset 54 by the artificial neural network 68. The linear dimensionality reduction stage may also be an optional step that may incorporate, for example, principal component analysis (PCA) or another linear technique with parameters that can be computed without iterative optimization to reduce a dimensionality or number of variables associated with the dataset 54 prior to transformation of the dataset 54 by the artificial neural network 68. The artificial neural network 68 may transform the optionally pre-processed and/or linear dimensionality reduced dataset 54 during the estimation or prediction stage using one or more non-linear layers of the artificial neural network 68.

For example, if the linear dimensionality reduction stage is employed to reduce the dimensionality of the dataset 54 and there is limited training data available for the artificial neural network 68, the artificial neural network 68 may be described as a multi-layer perceptron (MLP) having, perhaps, a shallow neural network configuration of two or three layers. Alternatively, if the artificial neural network 68 is configured as a deep neural network including many layers, such as recurrent and convolutional layers, the optional linear dimensionality reduction stage may become less relevant.

Therefore, by way of non-limiting examples and as described broadly, the artificial neural network 68 may be characterized as a single stage that may perform computations on the plurality of spectra 40, 56 or may include one or more hidden layers between an input layer and an output layer that may perform computations on the plurality of spectra 40, 56.

In one non-limiting example, the artificial neural network 68 may be described as a feedforward network and may transform the dataset 54 previously dimensionally reduced by principal component analysis (PCA) to reduce a dimensionality or number of variables associated with the dataset 54. That is, the feedforward network may include fully connected layers in which every node in one layer connects to every node in the next layer such that information flows in one direction between the input layer and the output layer without cycles.

More specifically, in one non-limiting example, the linear dimensionality reduction stage may use PCA and the artificial neural network 68 may be described as a multi-layer perceptron (MLP) having one hidden layer. That is, the linear dimensionality reduction stage may employ PCA to reduce a dimensionality of the plurality of spectra 40, 56 and transform the plurality of spectra 40, 56 from a high-dimensional dataset into a lower-dimensional dataset while preserving as much variance as possible. In particular, PCA may identify the principal components of the plurality of spectra 40, 56 that vary the most. Each principal component may be a linear combination of original variables, and the principal components may be ordered by an amount of variance each principal component represents. As such, a total variance in a transformed lower-dimensional dataset may equal a total variance in the original high-dimensional dataset of the plurality of spectra 40, 56.

For example, in operation, PCA may identify one or more linear combinations of original variables that capture a maximum variance in the plurality of spectra 40, 56. A first principal component may account for a largest possible variance, a second principal component may account for a next largest variance and is orthogonal or uncorrelated to the first principal component, and so on. Then, data may be standardized or centered, a covariance matrix may be calculated, and eigenvalues and eigenvectors of the covariance matrix may be calculated. Further, the eigenvectors may become the principal components and may be ordered by corresponding eigenvalues. Finally, data may be projected onto selected principal components to thereby transform the plurality of spectra 40, 56 from the high-dimensional dataset into the lower-dimensional dataset.

The MLP may be a universal function approximator and may include one or more layers of interconnected nodes or neurons that may learn complex, non-linear relationships in a dataset. The MLP may have three or more layers that include the input layer that receives raw data features; one or more intermediate, hidden layers that process information; and the output layer that produces a final prediction regarding the concentration 14 of the chemical entity 16 in the matrix 18. In operation, each mode may calculate a weighted sum by combining inputs from a previous layer using learned weights plus a bias term, and may apply a non-linear function to the weighted sum. The non-linear function may introduce non-linearity and may allow the artificial neural network 68 to learn complex patterns. In particular, the MLP may generate predictions by passing data from the input layer to the output layer; may compare the predictions to targets; may calculate gradients and update weights to minimize error; and may repeat this process across multiple data.

In another example, the artificial neural network 68 may be described as a convolutional neural network (CNN) and may include one or more convolutional layers configured to apply a kernel or filter across input data, e.g., the plurality of target spectra 40 and the plurality of reference spectra 56, i.e., Raman intensities 42 across wavenumbers 60, to detect features of the input data, such as peaks or patterns that correspond to specific molecular signatures, chemical bonds, or material properties. Since different chemical entities 16 may create characteristic peaks, valleys, and patterns in the target spectra 40 and reference spectra 56, each kernel or filter may produce a feature map to highlight where specific features may be found in the input data so that the artificial neural network 68 may learn to recognize such peaks, valleys, and patterns as spectral "fingerprints" or signatures of the different chemical entities 16. Broadly, the one or more convolutional layers may transform the plurality of target spectra 40 and/or the plurality of reference spectra 56 from one representation to another, learn to detect specific patterns, and create one or more feature maps to represent different aspects of the input data.

The artificial neural network 68 may also include one or more pooling layers configured to reduce one or more spatial dimensions of the input data and retain other information to thereby enhance an efficiency of the artificial neural network 68. In addition, the artificial neural network 68 may include one or more activation functions, such as a rectified linear unit function, to introduce non-linearity into the artificial neural network 68 and thereby allow the artificial neural network 68 to learn complex patterns. Broadly, the one or more pooling layers may decrease a computational load while retaining important features by reducing spatial dimensions of the plurality of target spectra 40 and/or plurality of reference spectra 56. For example, the one or more pooling layers may use max pooling to retain the strongest activations, and/or may use average pooling to smooth transitions of the input data.

The artificial neural network 68 may include one or more fully connected layers configured to combine learned features and make final classifications or predictions regarding the concentration 14 of the chemical entity 16 in the matrix 18. The artificial neural network 68 may include one or more recurrent layers configured to loop back on themselves. That is, the one or more recurrent layers may include connections that enable recursive looping. More specifically, the one or more recurrent layers may use information from previous inputs when processing current inputs such that the one or more recurrent layers have a memory mechanism. The memory mechanism may, for example, maintain an internal, hidden state that may update as new inputs arrive, thereby allowing the artificial neural network 68 to remember previous information.

The artificial neural network 68 may include one or more transformer layers configured to process positions in a sequence simultaneously rather than sequentially. The one or more transformer layers may include a self-attention feature designed to weigh an importance of different parts of the sequence when processing. That is, rather than relying on recurrence or convolution, the one or more transformer layers may use the self-attention feature to capture relationships between all positions in the sequence at once.

During operation or processing 72 (FIGS. 1 and 2), the artificial neural network 68 may transform raw input data through a series of mathematical operations to extract meaningful patterns and make predictions regarding the concentration 14 of the chemical entity 16 in the matrix 18. In particular, the artificial neural network 68 may generally start with comparatively low-level features, such as edges, in the input data with early layers and progressively build up to comparatively high-level features such as peaks and locations in deeper layers to thereby hierarchically learn. That is, the artificial neural network 68 may process raw input data; extract features from the input data through convolution; reduce dimensionality of the input data; learn increasingly complex features of the input data; and make decisions such as predictions of concentration 14.

For example, the artificial neural network 68 may receive the raw input data; slide kernels or filters across the input data to perform element-wise multiplication between the kernel or filter and the input data, and then sum the results to create feature maps to highlight specific patterns. The artificial neural network 68 may reduce a dimensionality of the feature maps to reduce computational load, e.g., by taking a maximum or average value from small portions of the feature maps. The artificial neural network 68 may then learn increasingly complex features. For example, early layers may detect peak presence and slope changes; middle layers may combine these elements into patterns of peak shapes, baseline variations, or specific spectral regions; and deeper layers may recognize and locate complete peaks, locations, and patterns that represent entire molecular structures or chemical compositions of the chemical entity 16. The artificial neural network 68 may then evaluate and combine all features to make a final prediction regarding the concentration 14 of the chemical entity 16 in the matrix 18.

Throughout such processing 72 (FIGS. 1 and 2), the artificial neural network 68 may automatically learn which features are most important for a specific task through training on many target spectra 40 and many reference spectra 56, as set forth in more detail below with respect to the method 10, 110. The artificial neural network 68 may also adjust kernel or filter values to minimize prediction errors, as also set forth in more detail below.

Therefore, in summary, the artificial neural network 68 may enable a) dynamically adjusting acquisition parameters during measurement, b) incorporating confidence scoring and quality control alerts during measurement, c) mitigating environmental interference during measurement, d) correcting baselines and reducing noise after measurement, e) interpreting measurement data in real time, and f) mapping target spectra 40 and predicting concentrations 14 of the chemical entity 16 in the matrix 18.

Controller

Referring again to FIG. 3, the instrument 20 also includes a controller 66 in communication with the surface-enhanced Raman spectrometer 38 and including an instruction set 100 that is executable to process the dataset 54 with the artificial neural network 68 to thereby quantify the concentration 14 of the chemical entity 16 in the matrix 18. That is, the controller 66 may execute the method 10, 110 of quantifying the concentration 14 of the chemical entity 16 in the matrix 18 as described below. Advantageously, the instruction set 100 or computer readable instructions may be embedded within the instrument 20 to thereby process the dataset 54 and quantify the concentration 14 of the chemical entity 16 in the matrix 18 in real time. That is, programming code for the artificial neural network 68 may physically reside on the instrument 20. Alternatively, the instruction set 100 may be located offsite from the instrument 20 and may be accessible via cloud computing infrastructure, the internet, and the like.

More specifically, the controller 66 may include the instruction set 100 to analyze data from the surface-enhanced Raman spectrometer 38 and instrument 20; take further actions regarding aspects of the method 10, 110, such as scanning 70 (FIGS. 1 and 2) and processing 72 (FIGS. 1 and 2); electrically communicate with the instrument 20; automatically schedule pre-calibration of the surface-enhanced Raman spectrometer 38 and/or instrument 20; monitor user inputs 64; monitor power levels of the instrument 20; and the like. The controller 66 may also be configured for automatedly or autonomously controlling the instrument 20 with or without active physical control by a human operator.

The controller 66 may include a processor (not shown), which may be part of a computer that controls the instrument 20, that may provide an input signal such that the controller 66 commands the surface-enhanced Raman spectrometer 38 to scan the sample 24 and/or commands the artificial neural network 68 to process the dataset 54. The processor and/or computer control may also store the plurality of target spectra 40 and the plurality of reference spectra 56 for each sample 24 to provide a history and troubleshooting options for future scanning 70 (FIGS. 1 and 2). The processor may be configured to operate the instruction set 100 and other programmed code and may operate an operating system. The processor may include random access memory (RAM) and a memory storage device such as a hard drive. As such, the method 10, 110 and system 12 may enable computer and/or machine learning via the artificial neural network 68 to accurately, reliably, and repeatably quantify the concentration 14 of the chemical entity 16.

In addition, although not shown in detail, the communication bus may be configured for enabling electronic communication between components of the instrument 20. The surface-enhanced Raman spectrometer 38, the controller 66, and the user display 62 may be electrically connected to the communication bus and may transmit data and computerized commands therethrough to execute the aspects of the method 10, 110.

Method

Referring now to FIG. 1, the method 10 may include first collecting and preparing the matrix 18. For example, for liquid matrices 18 such as groundwater, surface water, drinking water, landfill leachate, manufacturing or process effluent, rinsate such as aqueous film-forming foam (AFFF) from firefighting equipment, biological specimens, and the like, collecting may include gathering the matrix 18 in a collection container such as a sample tube 50 (FIG. 3), mixing vessel 52 (FIG. 3), beaker, flask, cylinder, or the like.

The collection container may be free from the particular chemical entity 16 of interest. Alternatively, for solid matrices 18 such as soil, dust, organic packaging, biological samples, and the like, the method 10 may include liquifying the solid matrix 18 by mixing the solid matrix 18 with, for example, deionized water or a solvent.

Combining

As described with continued reference to FIGS. 1 and 3, the method 10 includes combining 74 (FIG. 1) the aqueous sample buffer 28 (FIG. 3); the reporter reagent 30 (FIG. 3) including at least one reporter molecule selectively bindable to the chemical entity 16; the organic, non-polar extraction solvent 32 (FIG. 3) including the internal standard entity; the wash buffer 34 (FIG. 3); and the matrix 18 (FIG. 3) to thereby prepare the liquid precursor 26 (FIG. 3). As described broadly and set forth in more detail below, combining 74 may include preconcentrating the matrix 18, modulating a pH and an ionic strength of the sample 24, and inserting the known internal standard entity. Further, combining 74 may include selectively binding the at least one reporter molecule to the chemical entity 16 to thereby selectively enrich the target analyte and enhance the intensity of the plurality of target spectra 40.

In greater detail, combining 74 may include adding the aqueous sample buffer 28 and the reporter reagent 30 to the matrix 18 to form a first intermediate in a first container. For example, the aqueous sample buffer 28 and reporter reagent 30 may be added to 10 mL of the matrix 18 to form the first intermediate. Next, combining 74 may include adding the organic, non-polar extraction solvent 32 to the first intermediate to form a second intermediate, and mixing, e.g., shaking, the second intermediate for a first duration. For example, 1 mL of the organic, non-polar extraction solvent 32 may be added to the first intermediate and the second intermediate may be shaken for from 5 seconds to 15 seconds, e.g., for 10 seconds.

Solvent Extracting

Referring again to FIG. 1, the method 10 also includes solvent extracting 76 the sample 24 from the liquid precursor 26, wherein the sample 24 includes at least one of: the internal standard entity; and a plurality of complexes formed from the chemical entity 16 and the at least one reporter molecule. For example, if no chemical entity 16 is present in the matrix 18, the sample 24 includes the internal standard entity, but is free from the plurality of complexes formed from the chemical entity 16 and the at least one reporter molecule. However, if the chemical entity 16 is present in the matrix 18, the sample 24 includes the internal standard entity and the plurality of complexes formed from the chemical entity 16 and the at least one reporter molecule. Solvent extracting 76 or liquid-liquid extracting may partition phases of the liquid precursor 26 to separate the sample 24. That is, solvent extracting 76 may include partitioning the liquid precursor 26 into a plurality of liquid organic phases.

More specifically, solvent extracting 76 may further include, after mixing the second intermediate, settling the second intermediate for a second duration. The second duration may be longer than the first duration. For example, the second duration may be from 1 minute to 5 minutes, e.g., 2 minutes. Alternatively, the second duration may be shorter than the first duration or equal to the first duration. After settling the second intermediate, solvent extracting 76 may include transferring an extract supernatant 78 (FIG. 3) of the organic, non-polar extraction solvent 32 from the first container to a second container containing the wash buffer 34 to thereby mix the extract supernatant 78 of the non-polar extraction solvent 32 and the wash buffer 34 and form a third intermediate. Solvent extracting 76 may then include mixing the third intermediate for the first duration and, after mixing the third intermediate, settling the third intermediate for the second duration.

After settling the third intermediate, solvent extracting 76 may further include depositing 88 (FIG. 2) the extract supernatant 78 of the organic, non-polar extraction solvent 32 onto the pre-calibrated SERS substrate 36. For example, depositing 88 may include drop casting the extract supernatant 78 of the organic, non-polar extraction solvent 32 onto the pre-calibrated SERS substrate 36 in a first region 58 (FIG. 3) having a diameter 82 (FIG. 3) of from 1 millimeter (mm) to 20 mm, e.g., from 1 mm to 10 mm or from 1 mm to 7 mm or about 5 mm. After depositing 88, solvent extracting 76 may include evaporating the extract supernatant 78 of the organic, non-polar extraction solvent 32 for a third duration that is longer than the second duration to thereby dispose the sample 24 on the plurality of nanoparticles 46. For example, the third duration may be from 2 minutes to 8 minutes, e.g., 5 minutes.

Therefore, in one non-limiting example, combining 74 and solvent extracting 76 may include, for a 1 mL matrix 18 in a 1.5 mL tube, adding the following in order and mixing by shaking gently: 1) 1.0 mL liquid matrix 18, 2) 80 μL of the aqueous sample buffer 28, and 3) 100 μL of the reporter reagent 30 (30 ppm ethyl violet, pre-washed) to form the first intermediate, and 4) 250 μL of the organic, non-polar extraction solvent 32 to the first intermediate to form the second intermediate. After mixing, combining 74 and solvent extracting 76 may further include starting a timer for 2 minutes, mixing, e.g., shaking, the second intermediate by hand for 10 seconds and letting the second intermediate settle until the 2 minutes has elapsed. If an emulsion forms and phase separation is incomplete after 2 minutes, the second intermediate may be diluted with deionized water.

Solvent extracting 76 may further include transferring 200 μL of the extract supernatant 78, i.e., a top layer of the organic, non-polar extraction solvent 32, to another 1.5 mL tube containing 500 mL of the wash buffer 34 to form the third intermediate. Solvent extracting 76 may then include starting a timer for 2 minutes, mixing, e.g., shaking, the third intermediate by hand for 10 seconds and letting the third intermediate settle until the 2 minutes has elapsed.

Solvent extracting 76 may further include transferring 875 μL of the extract supernatant 78 to another tube containing 25 μL of the organic, non-polar extraction solvent 32 and mixing well by pipetting up and down. Further, solvent extracting 76 may include transferring or depositing 0.5 uL of extract supernatant 78 of the organic, non-polar extraction solvent 32 onto the pre-calibrated SERS substrate 36, and drying the organic, non-polar extraction solvent 32 at room temperature for 5 minutes.

Scanning

Referring again to FIG. 1, the method 10 further includes scanning 70 the sample 24 with the surface-enhanced Raman spectrometer 38 to produce the dataset 54 including the at least one of the plurality of target spectra 40 of the chemical entity 16; and a plurality of reference spectra 56 of the internal standard entity. That is, scanning 70 may include optically scanning the sample 24 disposed on the pre-calibrated SERS substrate 36 with the surface-enhanced Raman spectrometer 38 of the instrument 20. If the chemical entity 16 is present in the sample 24, scanning 70 may produce the plurality of target spectra 40 and the plurality of reference spectra 56 since the internal standard entity is present in every sample 24. If the chemical entity 16 is not present in the sample 24, scanning 70 may produce only the plurality of reference spectra 56 based on the presence of the internal standard entity.

More specifically, scanning 70 may include optically scanning the first region 58 (FIG. 3), i.e., a portion of the pre-calibrated SERS substrate 36 where the sample 24 is deposited or drop cast, and a plurality of additional regions 80 (FIG. 3) adjacent to the first region 58 on the pre-calibrated SERS substrate 36 to produce at least one of: from 5 target spectra 40 to 10,000 target spectra 40; and from 5 reference spectra 56 to 10,000 reference spectra 56. Stated differently, scanning 70 may include collecting, for example, hundreds of at least one of the target spectra 40 and the reference spectra 56 by spatially scanning 70 across various regions 58, 80 of the pre-calibrated SERS substrate 36.

As such, the method 10 may account for variables such as substrate 36 non-uniformity, user-to-user variability, diameter 82 (FIG. 3) of the sample 24 and the like. Stated differently, concentration-dependent deposition patterns may be factored into the quantification of the concentration 14 of the chemical entity 16 and the method 10 may include tolerating variability of the matrix 18 and non-uniformity of the pre-calibrated SERS substrate 36.

Verifying and Dynamically Adjusting an Acquisition Parameter

In addition, the method 10 may also include verifying 84 (FIGS. 1 and 2) the at least one acquisition parameter, i.e., the integration time, the excitation energy, and the focal positioning, with the artificial neural network 68 (FIG. 3) before scanning 70; and optionally, dynamically adjusting 90 the at least one acquisition parameter before scanning 70. That is, the method 10 may include assessing whether the settings for each acquisition parameter are sufficient to effectively scan the sample 24 and achieve reproducible results, and if necessary, adjusting 90 the at least one acquisition parameter in real time before scanning 70, regardless of the sample 24 diameter, condition of the pre-calibrated SERS substrate 36, and experience of the user of the instrument 20.

For example, since each sample 24 includes the internal standard entity, if a user incorrectly prepares or deposits the sample 24, if the substrate 36 is damaged, or if the excitation energy of the surface-enhanced Raman spectrometer 38 is set incorrectly, the method 10 may identify the error, provide an error signal to the user, and provide correction instructions to remedy the error. Therefore, the method 10 may not include required daily or per-sample calibration. Instead, since each sample 24 includes the internal standard entity, the method 10 may account for instrument drift over a measurement period, sample 24-to-sample 24 variance, and environmental conditions such as humidity, temperature, and the like.

Processing

Referring again to FIG. 1, the method 10 also includes processing 72 the dataset 54 to thereby quantify the concentration 14 of the chemical entity 16 in the matrix 18. To clarify, quantifying may include both qualitatively and quantitatively assessing the dataset 54. That is, processing 72 may include qualitatively detecting whether the chemical entity 16 is present in the matrix 18 in from 1 minute to 2 hours, e.g., from 1 minute to 1 hour or from 1 minute to 20 minutes. Alternatively or additionally, processing 72 may include quantitatively assessing the concentration 14 of the chemical entity 16 in the matrix 18 at a level of from 3 parts per trillion (ppt) of the chemical entity 16 to 100 parts per million (ppm) of the chemical entity 16 in from 1 minute to 2 hours, e.g., from 1 minute to 1 hour or from 1 minute to 20 minutes.

That is, processing 72 may include detecting a presence of the chemical entity 16 in the matrix 18, e.g., as evidenced by the plurality of target spectra 40, and, if so, how much of the chemical entity 16 is present in the matrix 18, e.g., as evidenced by the plurality of target spectra 40 and the plurality of reference spectra 56, as set forth in more detail below. Further, processing 72 may include qualitatively detecting and/or quantitatively assessing at parts-per-trillion levels in real-time, i.e., in from 1 minute to 2 hours or from 1 minute to 1 hour or from 1 minute to 20 minutes or from 5 minutes to 15 minutes or in about 10 minutes. For example, processing 72 may include quantitively detecting the chemical entity 16 in the matrix 18 at levels less than or equal to a maximum contaminant level of the chemical entity 16 set by the United States Environmental Protection Agency. For example, processing 72 may include measuring PFOA and PFOS in drinking water at less than or equal to 4 ppt and PFNA, PFHxS, HFPO-DA, and PFBS at less than or equal to 10 ppt.

As described in greater detail, processing 72 may include transforming the dataset 54, i.e., the plurality of target spectra 40 and/or the plurality of reference spectra 56, with the artificial neural network 68 to thereby predict the concentration 14 of the chemical entity 16 in the matrix 18. That is, processing 72 may include using the output or dataset 54 of the surface-enhanced Raman spectrometer 38 as input data for the artificial neural network 68. That is, processing 72 may include using computerized convolutional operations including one or more convolutional layers, pooling layers, recurrent layers, transformer layers, and fully connected layers to detect local patterns in the dataset 54 by sliding kernels or filters across the dataset 54. For the method 10, processing 72 may encompass spectral preprocessing, noise reduction, and quantitative analysis such as ai) pre-processing by applying a centering filter 86 (FIG. 5), aii) reducing a dimensionality of the dataset 54 by employing PCA, and aiii) predicting the concentration 14 of the chemical entity 16 in the matrix 18 by pushing an output of PCA through network transformations of the artificial neural network 68, from inputs to artificial neural network 68 embedding and from artificial neural network 68 embedding to prediction; or such as bi) pre-processing by applying the centering filter 86 without employing PCA and bii) predicting the concentration 14 of the chemical entity 16 in the matrix 18 by using a CNN to operate as learned dimensionality reduction from inputs to CNN embedding and from CNN embedding to prediction.

More specifically, for aii), PCA may produce a reduced dimensionality of the multiple spectra 40, 56, and the reduced dimensionality may be pushed through one or more network transformations of the artificial neural network 68. For bii), the CNN may operate directly on the multiple spectra 40, 56 and automatically learn to compress and transform the dataset 54 into a lower-dimensional representation that preserves the most important information from a specific layer for the next task or layer at hand. That is, the CNN may use a learned dimensionality reduction technique for processing 72 the dataset 54.

Training the Artificial Neural Network

As such, transforming the dataset 54 may include training the artificial neural network 68 with a training dataset. Training may include creating the training dataset by: preparing a plurality of samples 24 each having a separate determined concentration 14 of the chemical entity 16, and scanning 70 each of the plurality of samples 24 with the surface-enhanced Raman spectrometer 38. As a non-limiting example, several samples 24 may be prepared according to the sample preparation procedure set forth above for concentrations 14 of the chemical entity 16 of a) $750\times10^{-12}$; b) $500\times10^{-12}$; c) $250\times10^{-12}$; d) $100\times10^{-12}$; e) $50\times10^{-12}$; f) $25\times10^{-12}$; g) $5\times10^{-12}$; and h) $0\times10^{-12}$. After scanning 70 each sample 24, the dataset 54 may include both the plurality of target spectra 40 and the plurality of reference spectra 56 for each of samples a)-g), and merely the plurality of reference spectra 56 for sample h) since the chemical entity 16 is not present in the matrix 18 of sample h).

Then, broadly and by way of a non-limiting example, creating the training dataset may include ai) pre-processing the plurality of spectra 40, 56 by applying the centering filter 86 (FIG. 5), aii) reducing a dimensionality of the plurality of spectra 40, 56 using PCA and, aiii) predicting the concentration 14 of the chemical entity 16 by pushing some dimensions through neural transformations of the artificial neural network 68, from inputs to embedding and from embedding to prediction. Alternatively, as another non-limiting example, creating the training dataset may include bi) preprocessing the plurality of spectra 40, 56 by applying the centering filter 86 without PCA to produce centered data and bii) predicting the concentration 14 of the chemical entity 16 by pushing the centered data through the CNN, from inputs to embedding and from embedding to prediction.

As best described with reference to FIG. 5, creating the training dataset may include applying the centering filter 86 to the dataset 54 to reduce variation between each of the plurality of target spectra 40 and a respective one of the plurality of reference spectra 56 and produce a pre-processed centered dataset including at least one of a plurality of centered target spectra 140 and a plurality of centered reference spectra 156.

In one non-limiting example, the centering filter 86 may be a linear infinite-impulse response (IIR) filter designed to reduce noise, correct a baseline, and enhance Raman signal clarify and quantitative analysis. The linear infinite-impulse response (IIR) filter may be a digital signal processing filter that includes a "memory" in that a current output may depend on both current and past inputs, as well as past outputs. That is, the "infinite" description denotes that an impulse response of the filter may theoretically continue forever and may include a feedback loop in which previous outputs are fed back into the filter.

Referring again to FIG. 1, for the method 10, creating the training dataset may also include normalizing the plurality of centered target spectra 140 with respect to the plurality of centered reference spectra 156 and producing a plurality of normalized target spectra. That is, as set forth above, there may be possible sources of variation in the spectral measurements of components of the matrix 18 aside from the concentration 14 of the chemical entity 16. Such sources of variation may include, but are not limited to, a focal length from the laser to the pre-calibrated SERS substrate 36 or an amount of the sample 24 deposited on the substrate 36. To help account for these variations, the sample 24 includes the internal standard entity. Therefore, for a sample 24 having none of the chemical entity 16, i.e., a zero concentration of the chemical entity 16 or a blank sample 24, processing 72 will still produce a set of reference spectra 56.

Normalizing may then include analyzing a relative height of peaks of the centered target spectra 40 to a height of the peaks of the centered reference spectra 56. To normalize the plurality of centered target spectra relative to the peaks of the internal standard, normalizing may include calculating an average reference spectrum of the blank sample 24, finding the Raman intensity 42 that corresponds to a 90th percentile, and creating a weighting vector to produce a weighted average of the internal standard's intensity 42 per reference spectrum 56.

Referring again to FIG. 1, for the method 10, creating the training dataset may further include partitioning the plurality of normalized target spectra into a first training portion configured for inputting into the artificial neural network 68; and a second validation portion configured for validating a result of the artificial neural network 68. That is, the artificial neural network 68 may learn from the spectra 40, 56 of the first training portion to thereby produce a predicted or estimated concentration 14 of the chemical entity 16 for each of the samples 24, and the second validation portion may be used to validate the predicted or estimated concentrations 14 against the determined or known concentrations 14 of the prepared samples 24.

More specifically, the method 10 may include pushing the data of the first training portion and the second training portion through the artificial neural network 68 to predict or estimate the concentration 14 of the chemical entity 16 in the matrix 18 for each of the samples 24. Then, the method 10 may further include comparing the predicted or estimated concentration 14 of each of the plurality of samples 24 of the first training portion and the determined or known concentration of each of the plurality of samples 24 of the second validation portion until each of the predicted or estimated concentrations 14 differs from the respective determined or known concentration by less than or equal to a selected tolerance.

Creating the training dataset may then include propagating any error that is greater than the selected tolerance back to the artificial neural network 68 to update the training dataset so that the artificial neural network 68 may learn to minimize the error to less than the selected tolerance and thereby quickly and accurately predict the concentration 14 of the chemical entity 16 in any given sample 24 formed from any given matrix 18.

Therefore, in summary, processing 72 may include predicting the concentration 14 of the chemical entity 16 in the matrix 18 based on a baseline correlation. That is, processing 72 may include assessing the samples 24 with the artificial neural network 68 trained on a plurality of calibration datasets generated from certified reference standard concentrations 14 of the chemical entity 16 spiked into a plurality of example matrices 18 and from a plurality of environmental or field-procured matrices 18 having corresponding laboratory chemical entity 16 analysis results. Further, due to the presence of the internal standard and the reference spectra 56, processing 72 and assessing may include tolerating variability of the matrices 18 and non-uniformity of the pre-calibrated SERS substrate 36 and/or the prepared samples 24.

Beneficially, the embedded, trained artificial neural network 68 may be purpose-built for PFAS 116 detection in complex environmental samples 24 extracted from the field. Unlike other surface-enhanced Raman spectroscopy systems which may rely on generic pattern recognition or post hoc classification, the method 10, 110 and system 12 integrates the artificial neural network 68 across both data interpretation and data acquisition, which enables the method 10, 110 and system 12 to be comparatively more robust and accessible for non-expert users. In particular, the method 10, 110 and system 12 provide complexity-aware modeling; real-time adaptive acquisition; and on-device or instrument 20 signal enhancement and interpretation.

That is, with respect to complexity-aware modeling, the artificial neural network 68 may be trained on diverse Raman spectral datasets collected under varying acquisition conditions (e.g., changes in laser intensity, spatial scanning across the pre-calibrated SERS substrate 36, etc.), which may enable learning of PFAS 116 signal behavior across a range of field-relevant scenarios and enhance tolerance to matrix 18 variability and substrate 36 non-uniformity.

With respect to real-time adaptive acquisition, the method 10, system 12, and artificial neural network 68 may dynamically adjust the at least one acquisition parameter of the surface-enhanced Raman spectrometer 38 during measurement, which may guide non-specialist users to optimal signal quality without manual tuning. Such dynamic adjustment may close a gap between laboratory-grade instrumentation and real-world usability of the system 12 and method 10, 110.

With respect to on-instrument 20 signal enhancement and interpretation, all models of the artificial neural network 68 may be embedded in the instrument 20 for offline, real-time spectral analysis to enable rapid chemical entity 16 identification and quantification in the field, confidence scoring, and quality control alerts.

Quantifying the Concentration of PFAS

Referring now to FIG. 2, a method 110 of quantifying the concentration 14 of per- and polyfluoroalkyl substances (PFAS) 116 in the matrix 18 includes combining 74: the aqueous sample buffer 28; the reporter reagent 30 including at least one reporter molecule selectively bindable to the PFAS 116; the organic, non-polar extraction solvent 32 including the internal standard entity having a conjugated phenyl ring and a carbon-carbon triple bond; the wash buffer 34; and the matrix 18 to thereby prepare the liquid precursor 26.

As described with continued reference to FIG. 2, the method 110 also includes solvent extracting 76 the sample 24 from the liquid precursor 26 in less than or equal to 90 minutes, e.g., in less than or equal to 60 minutes or 45 minutes or 30 minutes or 15 minutes, wherein the sample 24 includes at least one of: the internal standard entity; and the plurality of complexes formed from the PFAS 116 and the at least one reporter molecule. Such solvent extracting 76 may be enabled by a) a comparatively low negative base-10 logarithm of the acid dissociation constant (pKa) value of PFAS 116 from, for example, sulfonic and carboxylic acid head groups and hydrophobic fluorinated chains that favor ionization in water; b) comparatively high logarithm of the octanol-water partition coefficient (log P) and comparatively high hydrophobicity that enable enrichment into a non-polar phase; and c) complexation with cationic reporter molecules to facilitate transport into the non-polar phase.

As shown in FIG. 2, the method 110 further includes depositing 88 the sample 24 onto the pre-calibrated surface-enhanced Raman spectroscopy (SERS) substrate 36 that includes the surface 44 and the plurality of nanoparticles 46 disposed on the surface 44. After depositing 88, the method 110 includes scanning 70 the sample 24 with the surface-enhanced Raman spectrometer 38 having at least one acquisition parameter including the integration time, the excitation intensity, and the focal positioning to produce the dataset 54 including at least one of: the plurality of target spectra 40 of the PFAS 116; and the plurality of reference spectra 56 of the internal standard entity.

Further, as described with continued reference to FIG. 2, the method 110 includes, prior to scanning 70, verifying 84 the at least one acquisition parameter and with the artificial neural network 68; and optionally, dynamically adjusting 90 the at least one acquisition parameter. That is, the method 110 may include assessing whether the settings for each acquisition parameter are sufficient to effectively scan the sample 24 and achieve reproducible results, and if necessary, adjusting 90 the at least one acquisition parameter in real time before scanning 70, regardless of the sample 24 diameter, condition of the pre-calibrated SERS substrate 36, and experience of the user of the instrument 20.

The method 110 then includes processing 72 the dataset 54 with the artificial neural network 68 to thereby quantify the concentration 14 of the PFAS 116 in the matrix 18 at a level of from 3 parts per trillion of the PFAS 116 to 100 parts per million of the PFAS 116 in from 1 minute to 2 hours. Processing 72 may include filtering out environmental interference within the matrix 18 from at least one of humic acid, chloride, and background fluorescence within the surface-enhanced Raman spectrometer 38. For example, since each sample 24 includes the internal standard entity, if the matrix 18 includes comparatively high levels of humic acid and/or chloride or if the excitation energy of the surface-enhanced Raman spectrometer 38 is set incorrectly, the method 110 may identify the error, provide an error signal to the user, and provide correction instructions to remedy the error. Therefore, the method 110 may account for instrument drift over a measurement period, sample 24-to-sample 24 variance, and environmental conditions such as humidity, temperature, humic acid, chloride, contaminants, and the like.

In summary, the method 10, 110 and system 12 may be useful for analyzing an environmental pollutant in groundwater or surface water. The method 10, 110 and system 12 may be suitable for applications requiring rapid, precise, cost-effective, on-site testing of matrices 18, particularly liquid matrices 18, for chemical entities 16 such as, but not limited to, PFAS 116 at parts-per-trillion (ppt) levels without extensive sample preparation. That is, the method 10, 110 and system 12 may provide rapid, user-friendly, cost-effective, and field-deployable or inline detection for monitoring, remediation, and compliance using the instrument 20 (FIG. 3) that is capable of real-time sensing for selectively and accurately detecting and quantifying PFAS 116 in complex environmental matrices 18 without extensive sample preparation or user training.

The method 10, 110 and system 12 may be both user-friendly and analytically rigorous. By directly addressing sample 24 reproducibility, matrix 18 interference, and sample 24 preparation limitations that may hinder other analyses, and by applying the embedded artificial neural network 68 for signal enhancement, the method 10, 110 and system 12 may be useful for confirming the presence of the chemical entity 16, e.g., PFAS 116, identifying specific compounds in diverse environmental matrices 18, and accurately measuring the concentration 14 in a real-world setting, i.e., under harsh field conditions, at low parts-per-trillion levels without complicated sample 24 preparation. Further, the method 10, 110 and system 12 may improve detection sensitivity and precision through artificial intelligence-enhanced signal processing to mitigate environmental interference from substances such as humic acid and chloride. Finally, the ease of use and short processing 72 times of the instrument 20 may enable high testing frequency and volumes and low cost.

The following Clauses provide example configurations of a method of quantifying a concentration of a chemical entity in a matrix, such as a method of quantifying a concentration of per- and polyfluoroalkyl substances (PFAS) in a matrix, and a system for quantifying a concentration of a chemical entity in a matrix, as disclosed herein.

Clause 1. A method of quantifying a concentration of a chemical entity in a matrix, the method comprising: combining: an aqueous sample buffer; a reporter reagent including at least one reporter molecule selectively bindable to the chemical entity; an organic, non-polar extraction solvent including an internal standard entity; a wash buffer; and the matrix to thereby prepare a liquid precursor; solvent extracting a sample from the liquid precursor, wherein the sample includes at least one of: the internal standard entity; and a plurality of complexes formed from the chemical entity and the at least one reporter molecule; scanning the sample with a surface-enhanced Raman spectrometer to produce a dataset including at least one of: a plurality of target spectra of the chemical entity; and a plurality of reference spectra of the internal standard entity; and processing the dataset to thereby quantify the concentration of the chemical entity in the matrix.

Clause 2. The method of clause 1, wherein combining includes selectively binding the at least one reporter molecule to the chemical entity to thereby enhance an intensity of the plurality of target spectra.

Clause 3. The method of any of the preceding clauses, wherein combining includes: adding the aqueous sample buffer and the reporter reagent to the matrix to form a first intermediate in a first container; adding the organic, non-polar extraction solvent to the first intermediate to form a second intermediate; and mixing the second intermediate for a first duration.

Clause 4. The method of any of the preceding clauses, wherein solvent extracting includes: after mixing the second intermediate, settling the second intermediate for a second duration; after settling the second intermediate, transferring an extract supernatant of the organic, non-polar extraction solvent from the first container to a second container containing the wash buffer to thereby mix the extract supernatant of the organic, non-polar extraction solvent and the wash buffer and form a third intermediate; mixing the third intermediate for the first duration; and after mixing the third intermediate, settling the third intermediate for the second duration.

Clause 5. The method of any of the preceding clauses, wherein solvent extracting further includes: after settling the third intermediate, depositing the extract supernatant of the organic, non-polar extraction solvent onto a pre-calibrated surface-enhanced Raman spectroscopy (SERS) substrate that includes a surface and a plurality of nanoparticles disposed on the surface; and after depositing, evaporating the extract supernatant of the organic, non-polar extraction solvent for a third duration that is longer than the second duration to thereby dispose the sample on the plurality of nanoparticles.

Clause 6. The method of any of the preceding clauses, wherein depositing includes drop casting the extract supernatant of the organic, non-polar extraction solvent onto the pre-calibrated SERS substrate in a first region.

Clause 7. The method of any of the preceding clauses, wherein scanning includes optically scanning the first region and a plurality of additional regions adjacent to the first region on the pre-calibrated SERS substrate to produce at least one of: from 5 target spectra to 10,000 target spectra; and from 5 reference spectra to 10,000 reference spectra.

Clause 8. The method of any of the preceding clauses, wherein processing includes qualitatively detecting whether the chemical entity is present in the matrix in from 1 minute to 2 hours.

Clause 9. The method of any of the preceding clauses, wherein processing includes quantitatively assessing the concentration of the chemical entity in the matrix at a level of from 3 parts per trillion of the chemical entity to 100 parts per million of the chemical entity in from 1 minute to 2 hours.

Clause 10. The method of any of the preceding clauses, wherein the surface-enhanced Raman spectrometer has at least one acquisition parameter including an integration time, an excitation intensity, and a focal positioning; and further including verifying the at least one acquisition parameter with an artificial neural network before scanning; and optionally, dynamically adjusting the at least one acquisition parameter before scanning.

Clause 11. The method of any of the preceding clauses, wherein processing includes transforming the dataset with an artificial neural network to thereby predict the concentration of the chemical entity in the matrix.

Clause 12. The method of any of the preceding clauses, wherein transforming includes training the artificial neural network with a training dataset.

Clause 13. The method of any of the preceding clauses, wherein training includes creating the training dataset by: preparing a plurality of samples each having a separate determined concentration of the chemical entity; and scanning each of the plurality of samples with the surface-enhanced Raman spectrometer.

Clause 14. The method of any of the preceding clauses, wherein creating the training dataset includes applying a centering filter to the dataset to reduce variation between each of the plurality of target spectra and a respective one of the plurality of reference spectra and produce a pre-processed centered dataset including at least one of a plurality of centered target spectra and a plurality of centered reference spectra.

Clause 15. The method of any of the preceding clauses, wherein creating the training dataset includes normalizing the plurality of centered target spectra with respect to the plurality of centered reference spectra and producing a plurality of normalized target spectra.

Clause 16. The method of any of the preceding clauses, wherein creating the training dataset includes partitioning the plurality of normalized target spectra into: a first training portion configured for inputting into the artificial neural network to thereby produce an estimated concentration for each of the plurality of samples; and a second validation portion configured for validating a result of the artificial neural network.

Clause 17. A method of quantifying a concentration of per- and polyfluoroalkyl substances (PFAS) in a matrix, the method comprising: combining: an aqueous sample buffer; a reporter reagent including at least one reporter molecule selectively bindable to the PFAS; an organic, non-polar extraction solvent including an internal standard entity having a conjugated phenyl ring and a carbon-carbon triple bond; a wash buffer; and the matrix to thereby prepare a liquid precursor; solvent extracting a sample from the liquid precursor in less than or equal to 90 minutes, wherein the sample includes at least one of: the internal standard entity; and a plurality of complexes formed from the PFAS and the at least one reporter molecule; depositing the sample onto a pre-calibrated surface-enhanced Raman spectroscopy (SERS) substrate that includes a surface and a plurality of nanoparticles disposed on the surface; after depositing, scanning the sample with a surface-enhanced Raman spectrometer having at least one acquisition parameter including an integration time, an excitation intensity, and a focal positioning to produce a dataset including at least one of: a plurality of target spectra of the PFAS; and a plurality of reference spectra of the internal standard entity; prior to scanning, verifying the at least one acquisition parameter and with an artificial neural network; optionally, dynamically adjusting the at least one acquisition parameter; and processing the dataset with the artificial neural network to thereby quantify the concentration of the PFAS in the matrix at a level of from 3 parts per trillion of the PFAS to 100 parts per million of the PFAS in from 1 minute to 2 hours.

Clause 18. The method of clause 17, wherein processing includes filtering out environmental interference within the matrix from at least one of humic acid, chloride, and background fluorescence within the surface-enhanced Raman spectrometer.

Clause 19. A system for quantifying a concentration of a chemical entity in a matrix, the system comprising: a sample preparation kit configured for preparing a sample solvent extracted from a liquid precursor formed from the matrix, wherein the sample preparation kit includes: an aqueous sample buffer; a reporter reagent including at least one reporter molecule selectively bindable to the chemical entity; an organic, non-polar extraction solvent including an internal standard entity; a wash buffer; and a pre-calibrated surface-enhanced Raman spectroscopy (SERS) substrate including: a surface; and a plurality of nanoparticles disposed on the surface; and an instrument configured for analyzing the sample disposed on the plurality of nanoparticles of the pre-calibrated SERS substrate and including: a surface-enhanced Raman spectrometer configured for optically scanning the sample to produce a dataset including at least one of: a plurality of target spectra of the chemical entity; and a plurality of reference spectra of the internal standard entity; an artificial neural network configured to process the dataset; and a controller in communication with the surface-enhanced Raman spectrometer and including an instruction set that is executable to process the dataset with the artificial neural network to thereby quantify the concentration of the chemical entity in the matrix.

Clause 20. The system of clause 19, wherein the instrument is portable.

The described embodiments of the present disclosure are intended to serve as non-limiting examples, and other embodiments may take various and alternative forms. In addition, the appended drawings are not necessarily to scale, and may present a somewhat simplified representation of various features of the present disclosure, including, for example, specific dimensions, orientations, locations, and shapes. Details associated with such features will be determined in part by the intended application and use environment of the described embodiments.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function. In addition, the use of ordinals such as first, second and third does not necessarily imply a ranked sense of order, but rather may merely distinguish between multiple instances of an act or structure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method of quantifying a concentration of a chemical entity in a matrix, the method comprising:
   combining:
      an aqueous sample buffer;
      a reporter reagent separate from the chemical entity and including at least one reporter molecule selectively bindable to the chemical entity;
      an organic, non-polar extraction solvent including an internal standard entity separate from the chemical entity;
      a wash buffer; and
      the matrix;
   to thereby prepare a liquid precursor;
   liquid-liquid extracting a sample of the liquid precursor, wherein the sample includes at least one of:
      the internal standard entity; and
      a plurality of complexes formed from the chemical entity and the at least one reporter molecule;
   scanning the sample with a surface-enhanced Raman spectrometer to produce a dataset including at least one of:
      a plurality of target spectra of the chemical entity; and
      a plurality of reference spectra of the internal standard entity; and
   processing the dataset to thereby quantify the concentration of the chemical entity in the sample formed from the matrix.

2. The method of claim 1, wherein combining includes selectively binding the at least one reporter molecule to the chemical entity to thereby enhance an intensity of the plurality of target spectra.

3. The method of claim 1, wherein combining includes:
   adding the aqueous sample buffer and the reporter reagent to the matrix to form a first intermediate in a first container;
   adding the organic, non-polar extraction solvent to the first intermediate to form a second intermediate; and
   mixing the second intermediate for a first duration.

4. The method of claim 3, wherein liquid-liquid extracting includes:
   after mixing the second intermediate, settling the second intermediate for a second duration;
   after settling the second intermediate, transferring an extract supernatant of the organic, non-polar extraction solvent from the first container to a second container containing the wash buffer to thereby mix the extract supernatant of the organic, non-polar extraction solvent and the wash buffer and form a third intermediate;

mixing the third intermediate for the first duration; and
   after mixing the third intermediate, settling the third intermediate for the second duration.

5. The method of claim 4, wherein liquid-liquid extracting further includes:
   after settling the third intermediate, depositing the extract supernatant of the organic, non-polar extraction solvent onto a pre-calibrated surface-enhanced Raman spectroscopy (SERS) substrate that includes a surface and a plurality of nanoparticles disposed on the surface; and
   after depositing, evaporating the extract supernatant of the organic, non-polar extraction solvent for a third duration that is longer than the second duration to thereby dispose the sample on the plurality of nanoparticles.

6. The method of claim 5, wherein depositing includes drop casting the extract supernatant of the organic, non-polar extraction solvent onto the pre-calibrated SERS substrate in a first region.

7. The method of claim 6, wherein scanning includes optically scanning the first region and a plurality of additional regions adjacent to the first region on the pre-calibrated SERS substrate to produce at least one of:
   from 5 target spectra to 10,000 target spectra; and
   from 5 reference spectra to 10,000 reference spectra.

8. The method of claim 1, wherein processing includes detecting whether the chemical entity is present in the matrix in from 1 minute to 2 hours.

9. The method of claim 1, wherein processing includes detecting the concentration of the chemical entity in the matrix at a level of from 3 parts per trillion of the chemical entity to 100 parts per million of the chemical entity in from 1 minute to 2 hours.

10. The method of claim 1, wherein the surface-enhanced Raman spectrometer has at least one acquisition parameter including an integration time, an excitation intensity, and a focal positioning; and
   further including verifying the at least one acquisition parameter with an artificial neural network before scanning; and
   optionally adjusting the at least one acquisition parameter before scanning.

11. The method of claim 1, wherein processing includes transforming the dataset with an artificial neural network to thereby predict the concentration of the chemical entity in the matrix.

12. The method of claim 11, wherein transforming includes training the artificial neural network with a training dataset.

13. The method of claim 12, wherein training includes creating the training dataset by:
   preparing a plurality of samples each having a separate determined concentration of the chemical entity; and
   scanning each of the plurality of samples with the surface-enhanced Raman spectrometer.

14. The method of claim 13, wherein creating the training dataset includes applying a centering filter to the dataset to reduce variation between each of the plurality of target spectra and a respective one of the plurality of reference spectra and produce a pre-processed centered dataset including at least one of a plurality of centered target spectra and a plurality of centered reference spectra.

15. The method of claim 14, wherein creating the training dataset includes normalizing the plurality of centered target spectra with respect to the plurality of centered reference spectra and producing a plurality of normalized target spectra.

16. The method of claim 15, wherein creating the training dataset includes partitioning the plurality of normalized target spectra into:

a first training portion configured for inputting into the artificial neural network to thereby produce an estimated concentration for each of the plurality of samples; and a second validation portion configured for validating a result of the artificial neural network.

17. A method of quantifying a concentration of per- and polyfluoroalkyl substances (PFAS) in a matrix, the method comprising:

combining:

an aqueous sample buffer;

a reporter reagent separate from the PFAS and including at least one reporter molecule selectively bindable to the PFAS;

an organic, non-polar extraction solvent including an internal standard entity separate from the PFAS and having a conjugated phenyl ring and a carbon-carbon triple bond;

a wash buffer; and the matrix;

to thereby prepare a liquid precursor;

liquid-liquid extracting a sample of the liquid precursor in less than or equal to 90 minutes, wherein the sample includes at least one of:

the internal standard entity; and a plurality of complexes formed from the PFAS and the at least one reporter molecule;

depositing the sample onto a pre-calibrated surface-enhanced Raman spectroscopy (SERS) substrate that includes a surface and a plurality of nanoparticles disposed on the surface;

after depositing, scanning the sample with a surface-enhanced Raman spectrometer having at least one acquisition parameter including an integration time, an excitation intensity, and a focal positioning to produce a dataset including at least one of:

a plurality of target spectra of the PFAS; and a plurality of reference spectra of the internal standard entity;

prior to scanning, verifying the at least one acquisition parameter and with an artificial neural network;

optionally adjusting the at least one acquisition parameter; and processing the dataset with the artificial neural network to thereby quantify the concentration of the PFAS in the sample formed from the matrix at a level of from 3 parts per trillion of the PFAS to 100 parts per million of the PFAS in from 1 minute to 2 hours.

18. The method of claim 17, wherein processing includes filtering out environmental interference within the matrix from at least one of humic acid, chloride, and background fluorescence within the surface-enhanced Raman spectrometer.

19. A system for quantifying a concentration of a chemical entity in a matrix, the system comprising:

a sample preparation kit configured for preparing a sample solvent extracted from a liquid precursor formed from the matrix, wherein the sample preparation kit includes:

an aqueous sample buffer;

a reporter reagent including at least one reporter molecule selectively bindable to the chemical entity;

an organic, non-polar extraction solvent including an internal standard entity;

a wash buffer; and a pre-calibrated surface-enhanced Raman spectroscopy (SERS) substrate including:

a surface; and a plurality of nanoparticles disposed on the surface; and an instrument configured for analyzing the sample disposed on the plurality of nanoparticles of the pre-calibrated SERS substrate and including:

a surface-enhanced Raman spectrometer configured for optically scanning the sample to produce a dataset including at least one of:

a plurality of target spectra of the chemical entity; and a plurality of reference spectra of the internal standard entity;

an artificial neural network configured to process the dataset; and a controller in communication with the surface-enhanced Raman spectrometer and including an instruction set that is executable to process the dataset with the artificial neural network to thereby quantify the concentration of the chemical entity in the matrix.

20. The system of claim 19, wherein the instrument is portable.

* * * * *